(12) United States Patent
Li et al.

(10) Patent No.: US 11,249,710 B2
(45) Date of Patent: Feb. 15, 2022

(54) TECHNOLOGY ADD-ON CONTROL CONSOLE

(71) Applicant: Splunk Inc., San Francisco, CA (US)

(72) Inventors: Li Li, Shanghai (CN); Gang Tao, Shanghai (CN); Yongxin Su, Shanghai (CN); Junqing Hao, Nanjing (CN); Ting Wang, Shanghai (CN); John Robert Coates, Berkeley, CA (US); Elias Haddad, San Francisco, CA (US); Guodong Wang, Shanghai (CN)

(73) Assignee: SPLUNK INC., San Francisco, CA (US)

( * ) Notice: Subject to any disclaimer, the term of this patent is extended or adjusted under 35 U.S.C. 154(b) by 773 days.

(21) Appl. No.: 15/088,106

(22) Filed: Mar. 31, 2016

(65) Prior Publication Data

US 2017/0286038 A1 Oct. 5, 2017

(51) Int. Cl.

| | |
|---|---|
| *G06Q 10/06* | (2012.01) |
| *G06N 5/02* | (2006.01) |
| *G06F 17/40* | (2006.01) |
| *G06F 3/14* | (2006.01) |

(52) U.S. Cl.
CPC ............. *G06F 3/14* (2013.01); *G06F 17/40* (2013.01); *G06N 5/022* (2013.01); *G06N 5/025* (2013.01); *G06Q 10/063* (2013.01); *G09G 2358/00* (2013.01); *G09G 2370/02* (2013.01); *G09G 2370/10* (2013.01)

(58) Field of Classification Search
CPC ............ G06F 3/14; G06F 17/30; G06F 17/40; G06Q 10/063; G09G 2370/02; G09G 2358/00; G09G 2370/10; G06N 5/025; G06N 5/022
See application file for complete search history.

(56) References Cited

U.S. PATENT DOCUMENTS

| | | | |
|---|---|---|---|
| 9,135,560 B1 * | 9/2015 | Saurabh .................. | G06N 5/046 |
| 9,262,519 B1 * | 2/2016 | Saurabh ................ | G06F 16/285 |
| 2003/0220747 A1 * | 11/2003 | Vailaya .................. | G16B 50/00 |
| | | | 702/19 |
| 2004/0030685 A1 * | 2/2004 | Helles .................... | G06F 16/951 |
| 2005/0149552 A1 | 7/2005 | Chan et al. | |
| 2007/0136220 A1 * | 6/2007 | Sakurai .................. | G06N 20/00 |
| | | | 706/20 |
| 2010/0223214 A1 * | 9/2010 | Kirpal ..................... | G06F 16/86 |
| | | | 706/12 |

(Continued)

*Primary Examiner* — Kavita Stanley
*Assistant Examiner* — Phoebe X Pan
(74) *Attorney, Agent, or Firm* — Ferguson Braswell Fraser Kubasta PC

(57) ABSTRACT

The operation of an automatic data input and query system is controlled by well-defined control data. The system exposes user interfaces enabling an administrator to interact with control data to modify the ongoing operation of the system. Certain control data determines the collection and treatment of data from various technology sources. A robust control interface is provided enabling the efficient and reliable adding on of new technology data sources. Once established, control data for a new technology data source may be packaged in a form for archiving or distribution. The system may support the export and import of such packages. Such packages may be created independently of the system.

30 Claims, 38 Drawing Sheets

(56) References Cited

U.S. PATENT DOCUMENTS

| | | | |
|---|---|---|---|
| 2011/0296244 A1* | 12/2011 | Fu | G06F 11/3608 |
| | | | 714/37 |
| 2013/0036348 A1 | 2/2013 | Hazard | |
| 2014/0153821 A1* | 6/2014 | Masuko | G06F 17/3025 |
| | | | 382/162 |
| 2014/0207792 A1* | 7/2014 | Carasso | G06F 17/271 |
| | | | 707/748 |
| 2015/0019204 A1* | 1/2015 | Simard | H04L 1/0079 |
| | | | 704/9 |
| 2015/0039651 A1* | 2/2015 | Kinsely | G06F 17/30563 |
| | | | 707/779 |
| 2015/0154269 A1 | 6/2015 | Miller et al. | |
| 2015/0154501 A1* | 6/2015 | Boddhu | G06F 40/279 |
| | | | 706/52 |
| 2015/0212663 A1 | 7/2015 | Papale et al. | |
| 2015/0242761 A1* | 8/2015 | Amershi | G06K 9/00536 |
| | | | 706/11 |
| 2015/0378684 A1* | 12/2015 | Kaplinger | G06F 17/30 |
| | | | 717/104 |
| 2016/0119268 A1* | 4/2016 | Sharp | H04L 51/12 |
| | | | 709/206 |
| 2016/0328654 A1* | 11/2016 | Bauer | G06K 9/6267 |

\* cited by examiner

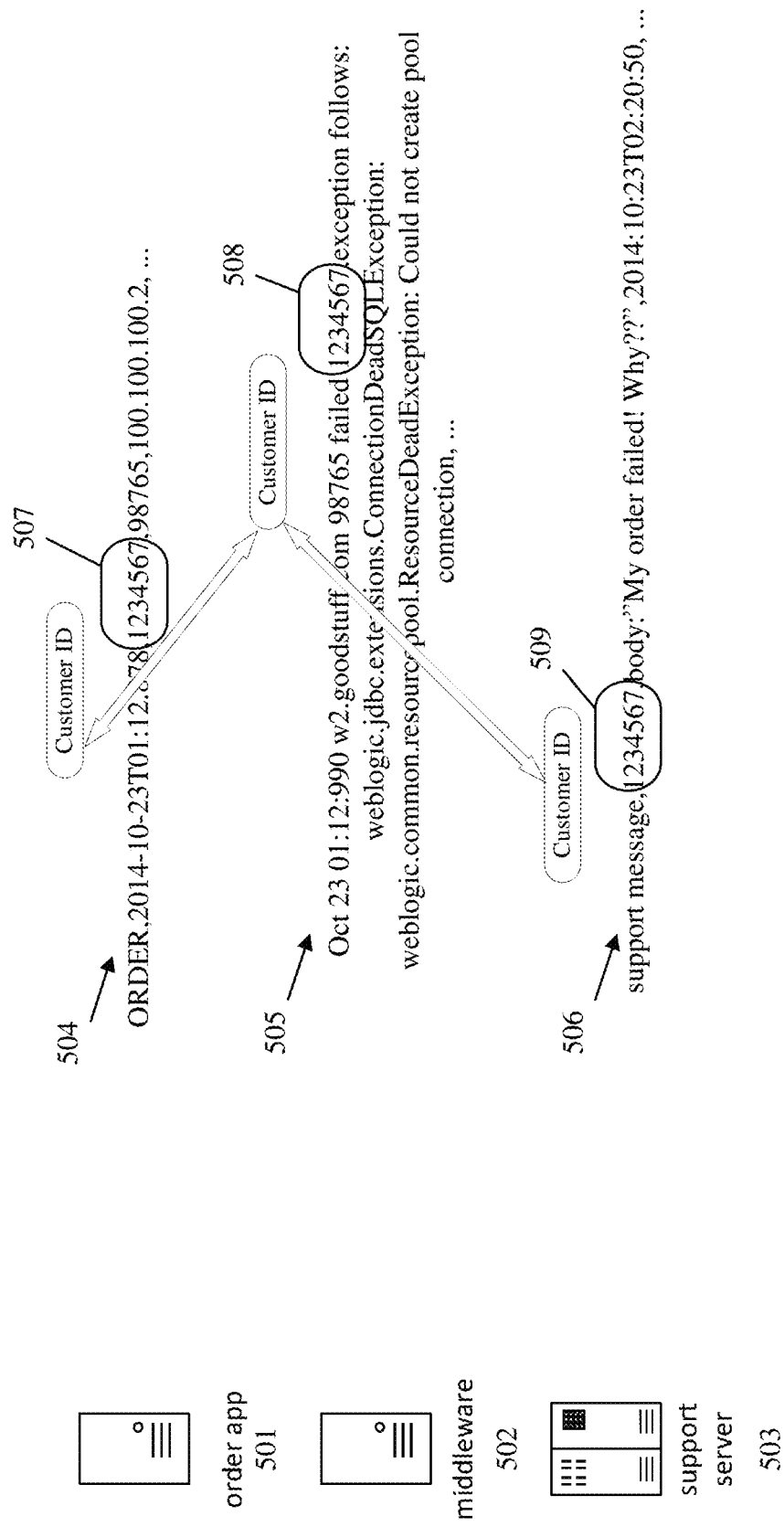

FIG. 6B

TECHNOLOGY ADD-ON CONTROL CONSOLE

TECHNICAL FIELD

The present disclosure is generally directed to data intake and query systems, and more particularly, to the control of related systems.

BRIEF DESCRIPTION OF THE DRAWINGS

In the drawings:

FIG. 5 illustrates a scenario where a common customer ID is found among log data received from three disparate sources in accordance with the disclosed embodiments;

FIG. 6B illustrates a data summary dialog that enables a user to select various data sources in accordance with the disclosed embodiments;

DETAILED DESCRIPTION

Figure 1:
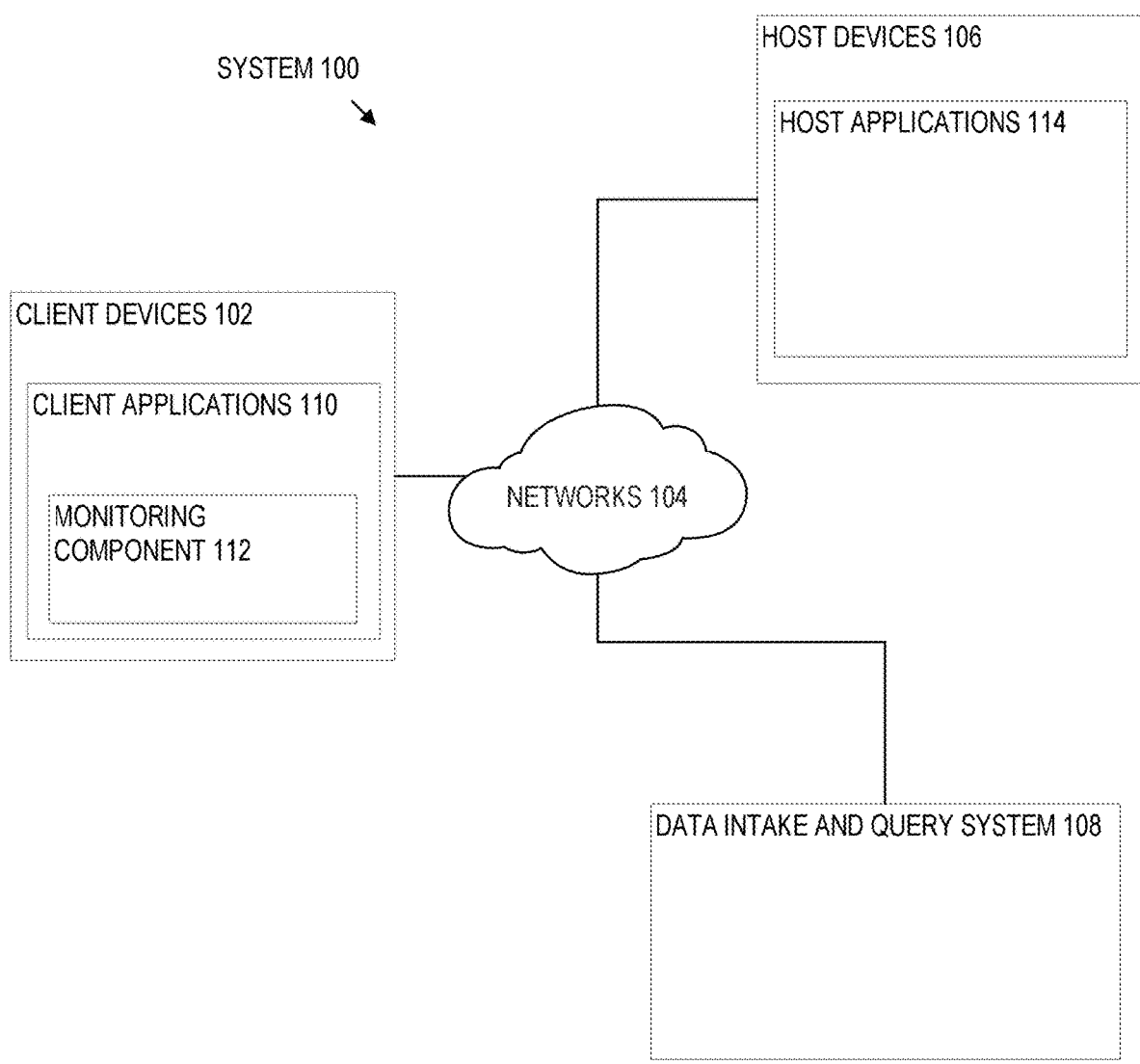
FIG. 1 illustrates a networked computer environment in which an embodiment may be implemented.

Embodiments are described herein according to the following outline:

1.0. General Overview
2.0. Operating Environment
   2.1. Host Devices
   2.2. Client Devices
   2.3. Client Device Applications
   2.4. Data Server System
   2.5. Data Ingestion
      2.5.1. Input
      2.5.2. Parsing
      2.5.3. Indexing
   2.6. Query Processing
   2.7. Field Extraction
   2.8. Example Search Screen
   2.9. Data Modelling
   2.10. Acceleration Techniques
      2.10.1. Aggregation Technique
      2.10.2. Keyword Index
      2.10.3. High Performance Analytics Store
      2.10.4. Accelerating Report Generation
   2.11. Security Features
   2.12. Data Center Monitoring
   2.13. Cloud-Based System Overview
   2.14. Searching Externally Archived Data
      2.14.1. ERP Process Features
3.0. TECHNOLOGY ADD-ON CONTROL INTERFACE
   1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
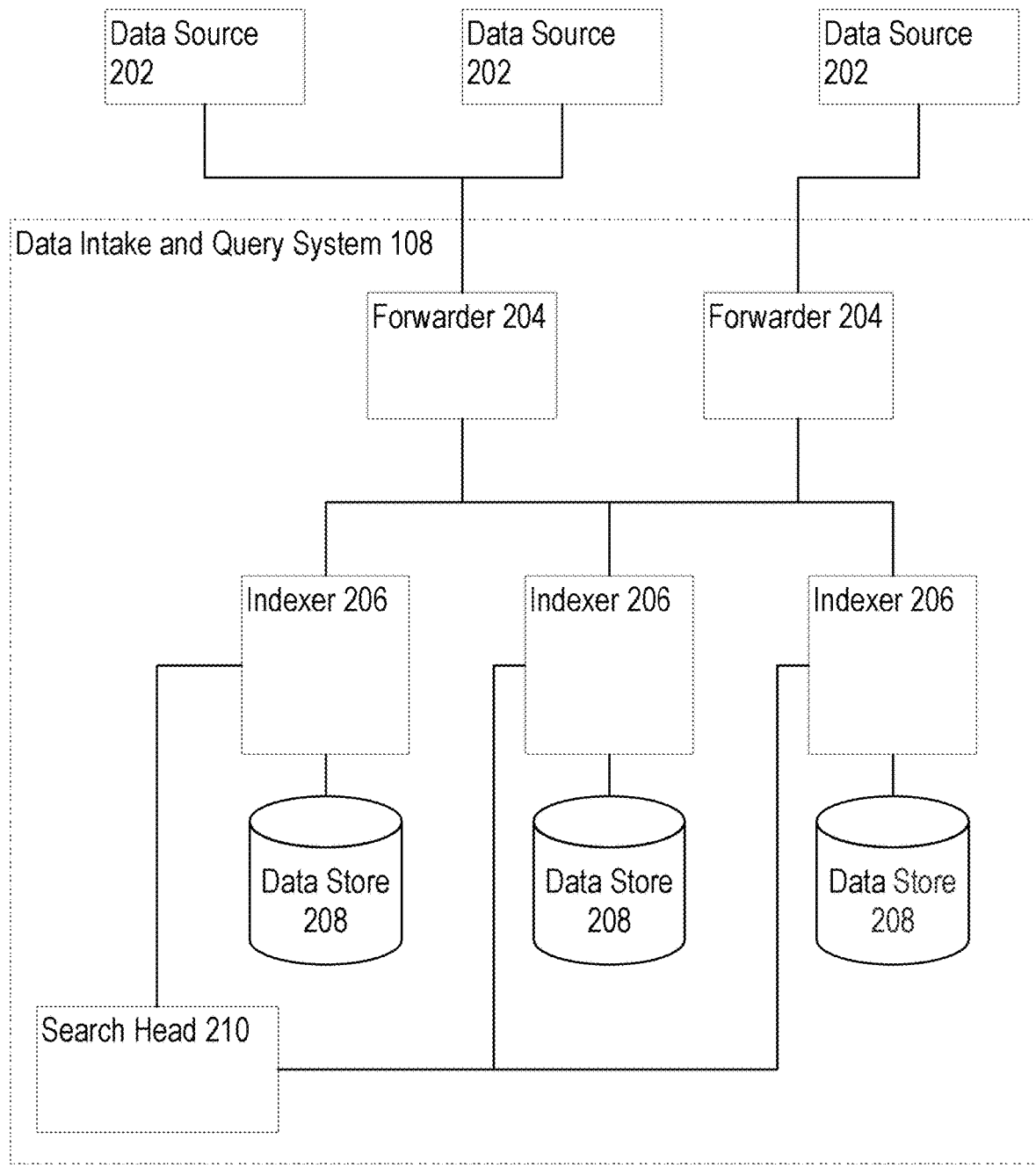
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
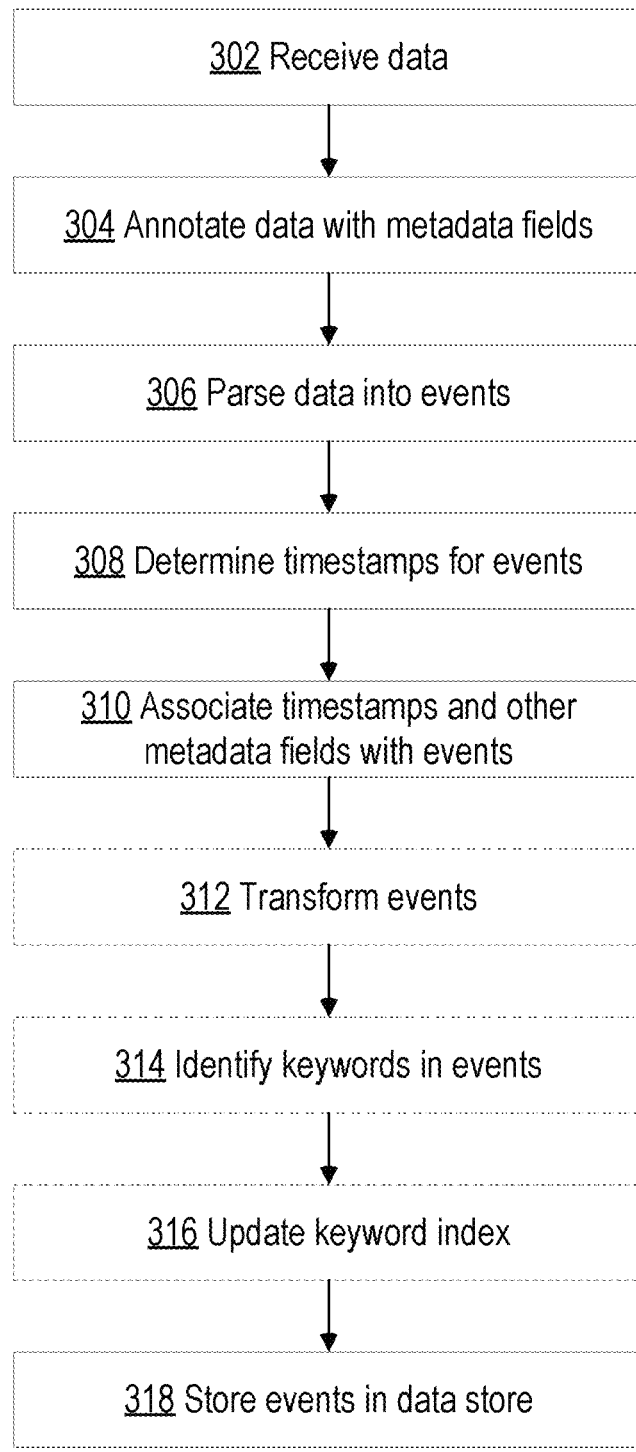
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
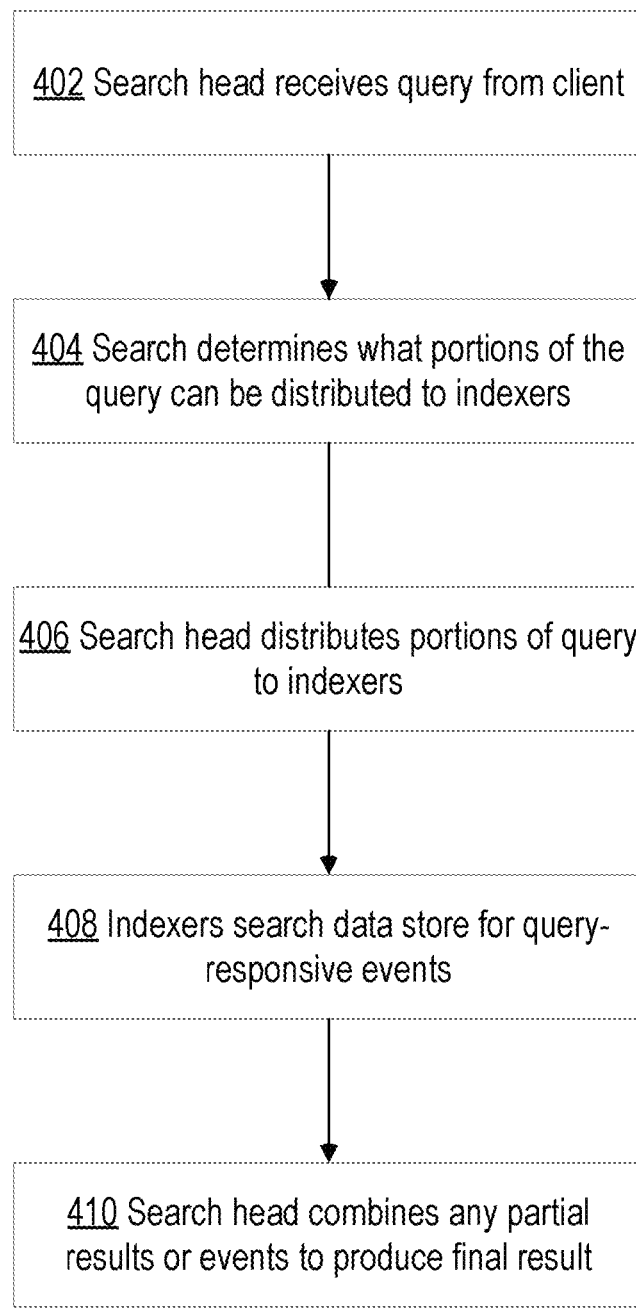
FIG. 4 is a flow diagram that illustrates how a search head and indexers perform a search query in accordance with the disclosed embodiments.

FIG. 4 is a flow diagram that illustrates an examplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8. Example Search Screen

Figure 6A:
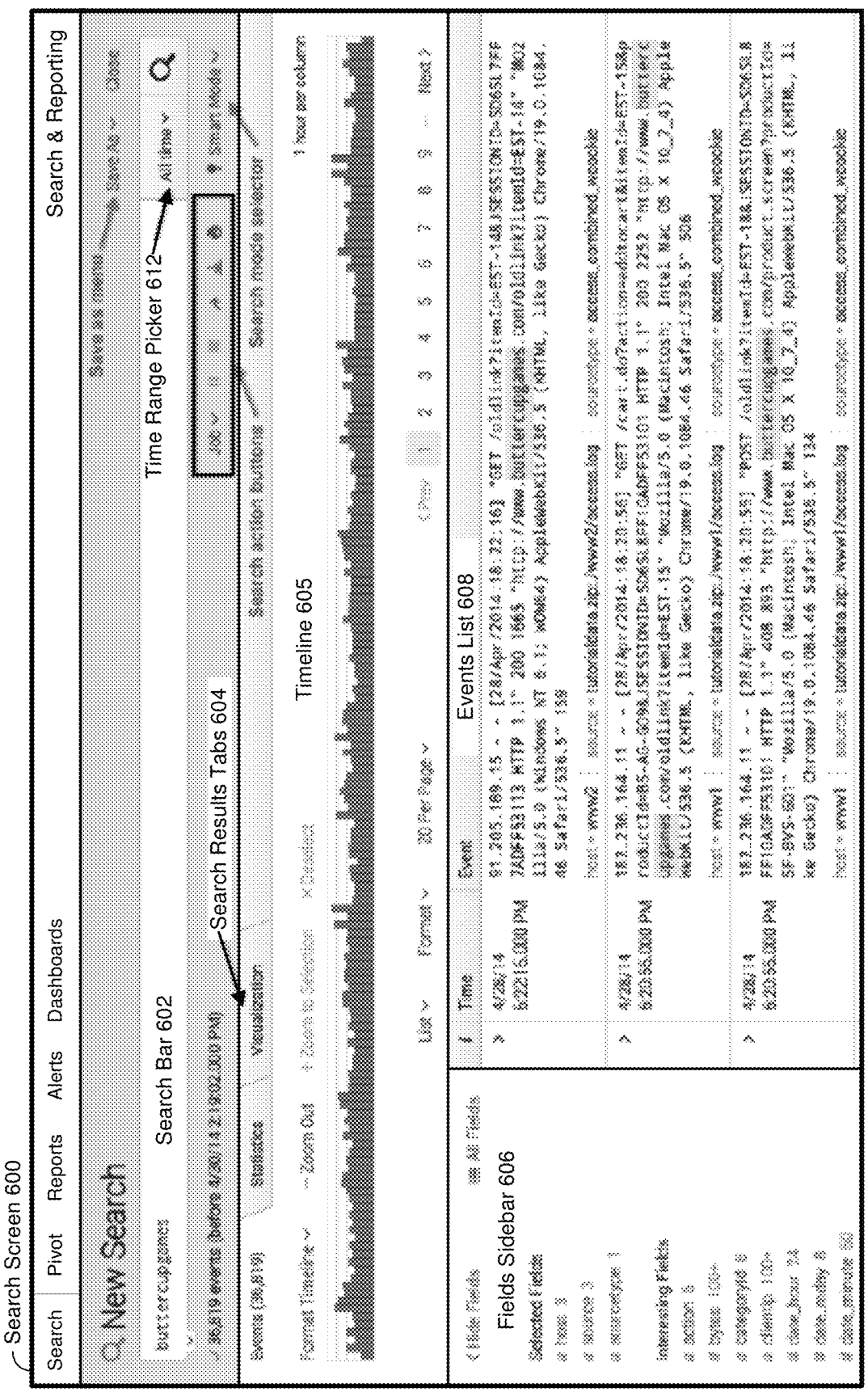
FIG. 6A illustrates a search screen in accordance with the disclosed embodiments.
Figure 6B:
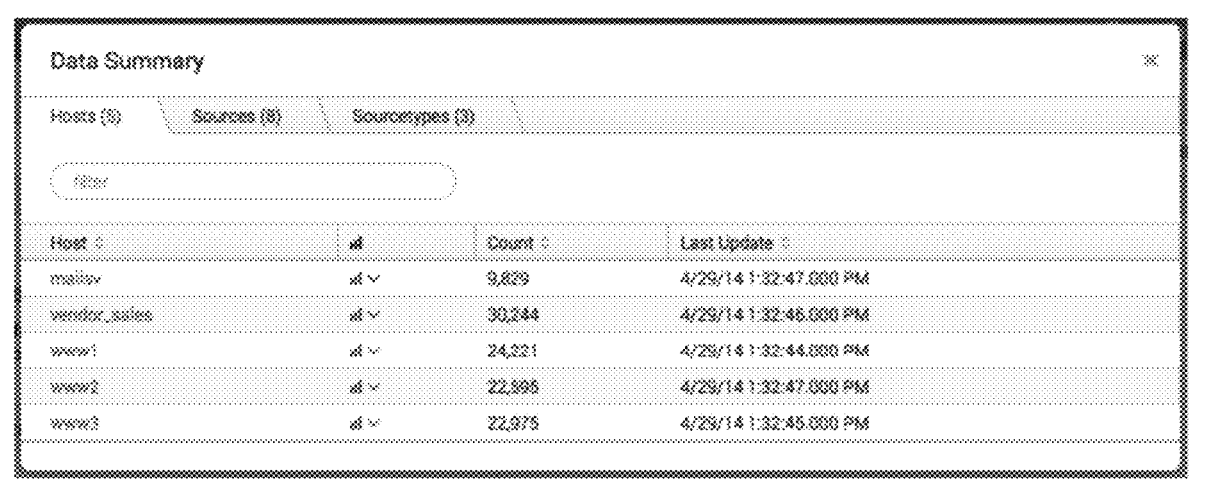

FIG. 6A illustrates an example search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, such as by selecting specific hosts and log files.

After the search is executed, the search screen 600 in FIG. 6A can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.9. Data Models

A data model is a hierarchically structured search-time mapping of semantic knowledge about one or more datasets. It encodes the domain knowledge necessary to build a variety of specialized searches of those datasets. Those searches, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

A child of the parent data model may be defined by a search (typically a narrower search) that produces a subset of the events that would be produced by the parent data model's search. The child's set of fields can include a subset of the set of fields of the parent data model and/or additional fields. Data model objects that reference the subsets can be arranged in a hierarchical manner, so that child subsets of events are proper subsets of their parents. A user iteratively applies a model development tool (not shown in Fig.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform searches of other data.

FIGS. 12, 13, and 7A-7D illustrate a series of user interface screens where a user may select report generation options using data models. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 12:
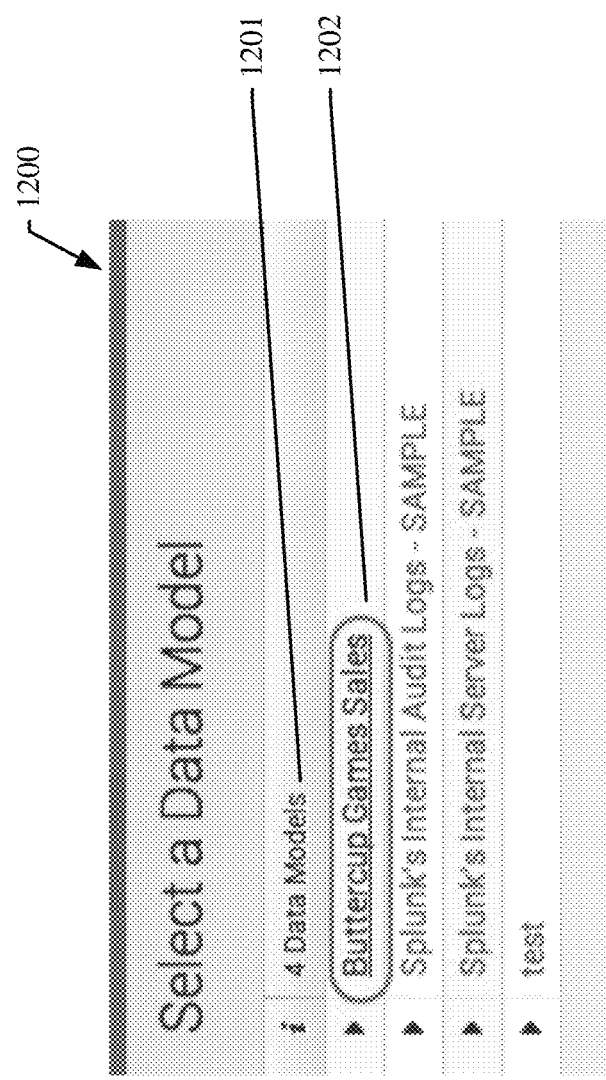
FIGS. 12-14 illustrate a series of user interface screens for an example data model-driven report generation interface in accordance with the disclosed embodiments.

The selection of a data model object for use in driving a report generation may be facilitated by a data model object selection interface. FIG. 12 illustrates an example interactive data model selection graphical user interface 1200 of a report editor that displays a listing of available data models 1201. The user may select one of the data models 1202.

Figure 13:
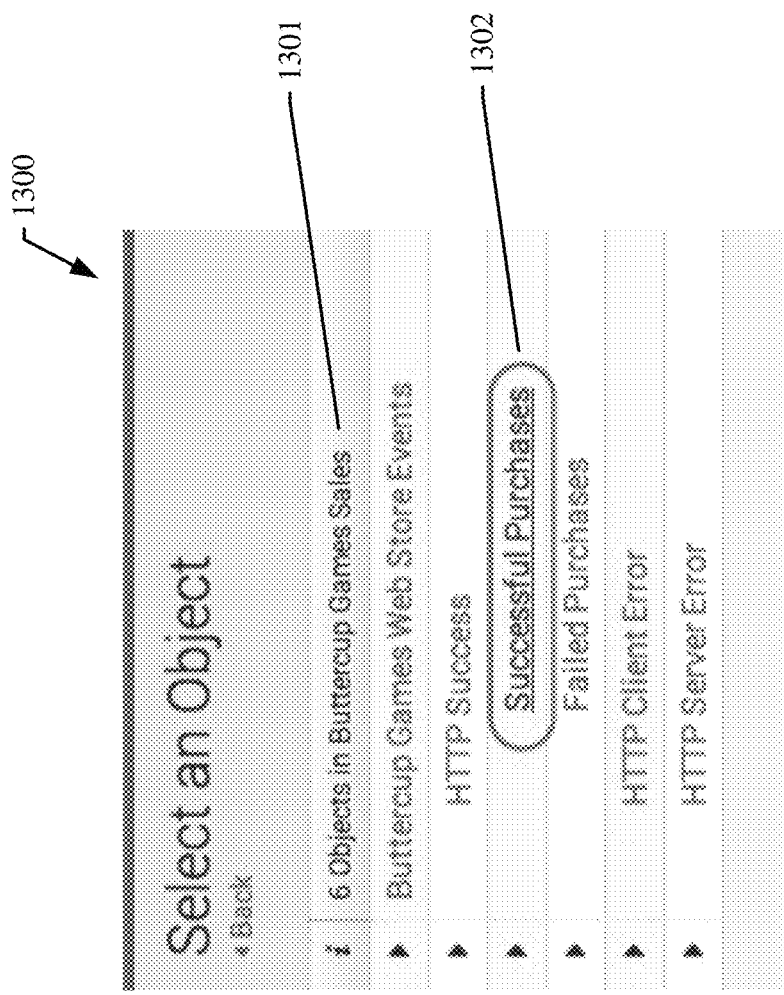

FIG. 13 illustrates an example data model object selection graphical user interface 1300 that displays available data objects 1301 for the selected data object model 1202. The user may select one of the displayed data model objects 1302 for use in driving the report generation process.

Figure 7A:
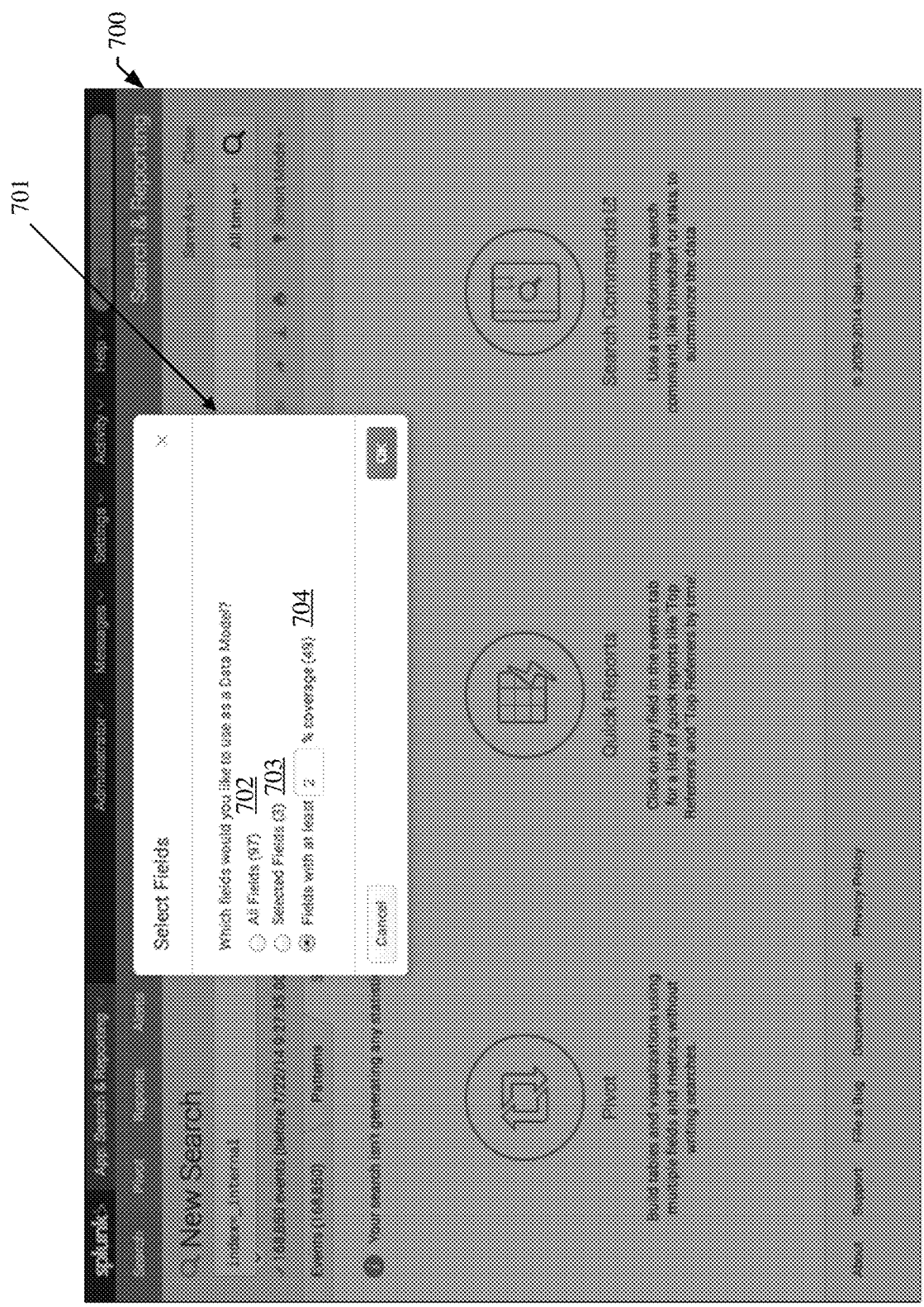
FIGS. 7A-7D illustrate a series of user interface screens for an example data model-driven report generation interface in accordance with the disclosed embodiments.

Once a data model object is selected by the user, a user interface screen 700 shown in FIG. 7A may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial search query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 7B:
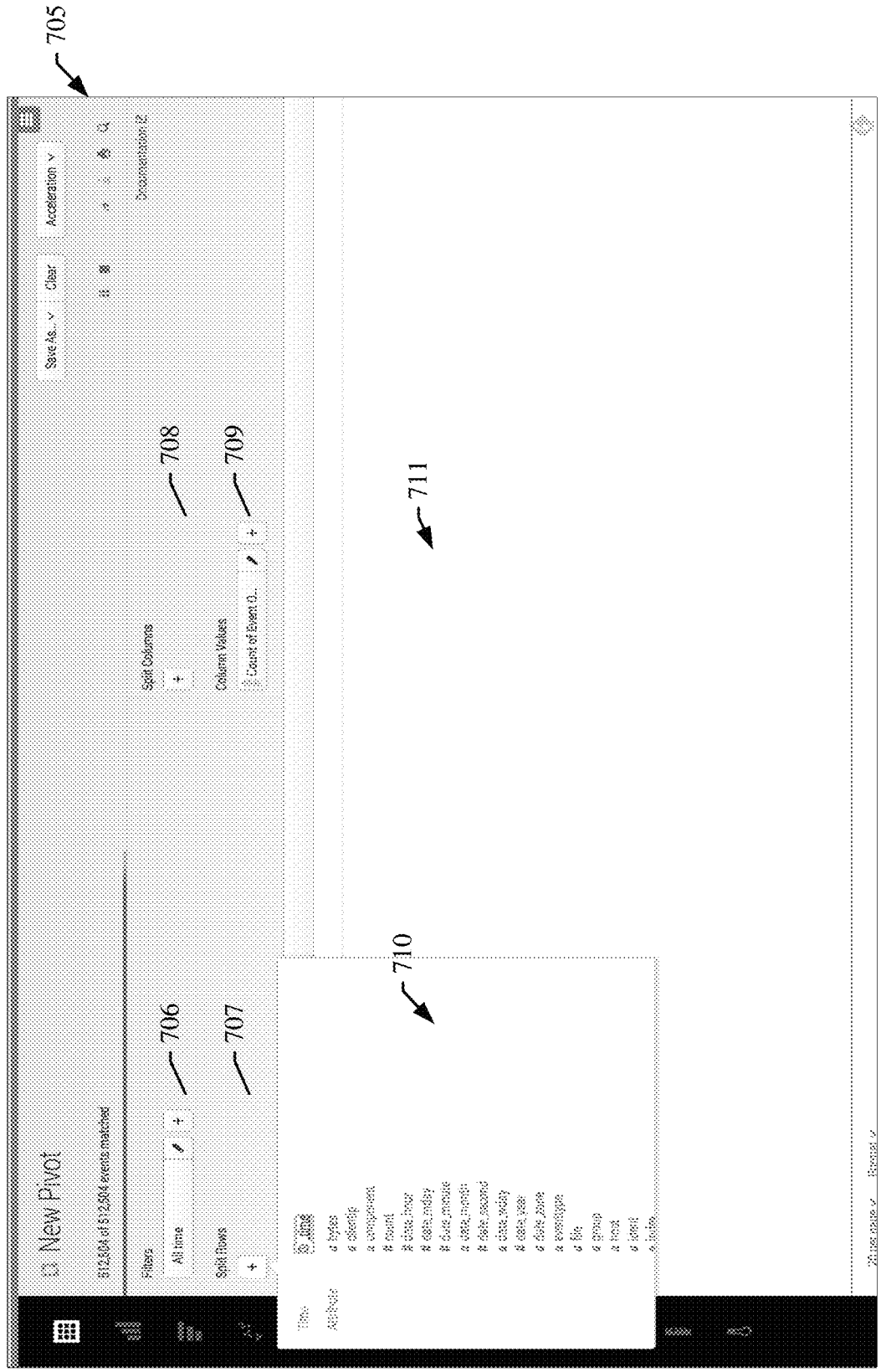
Figure 7C:
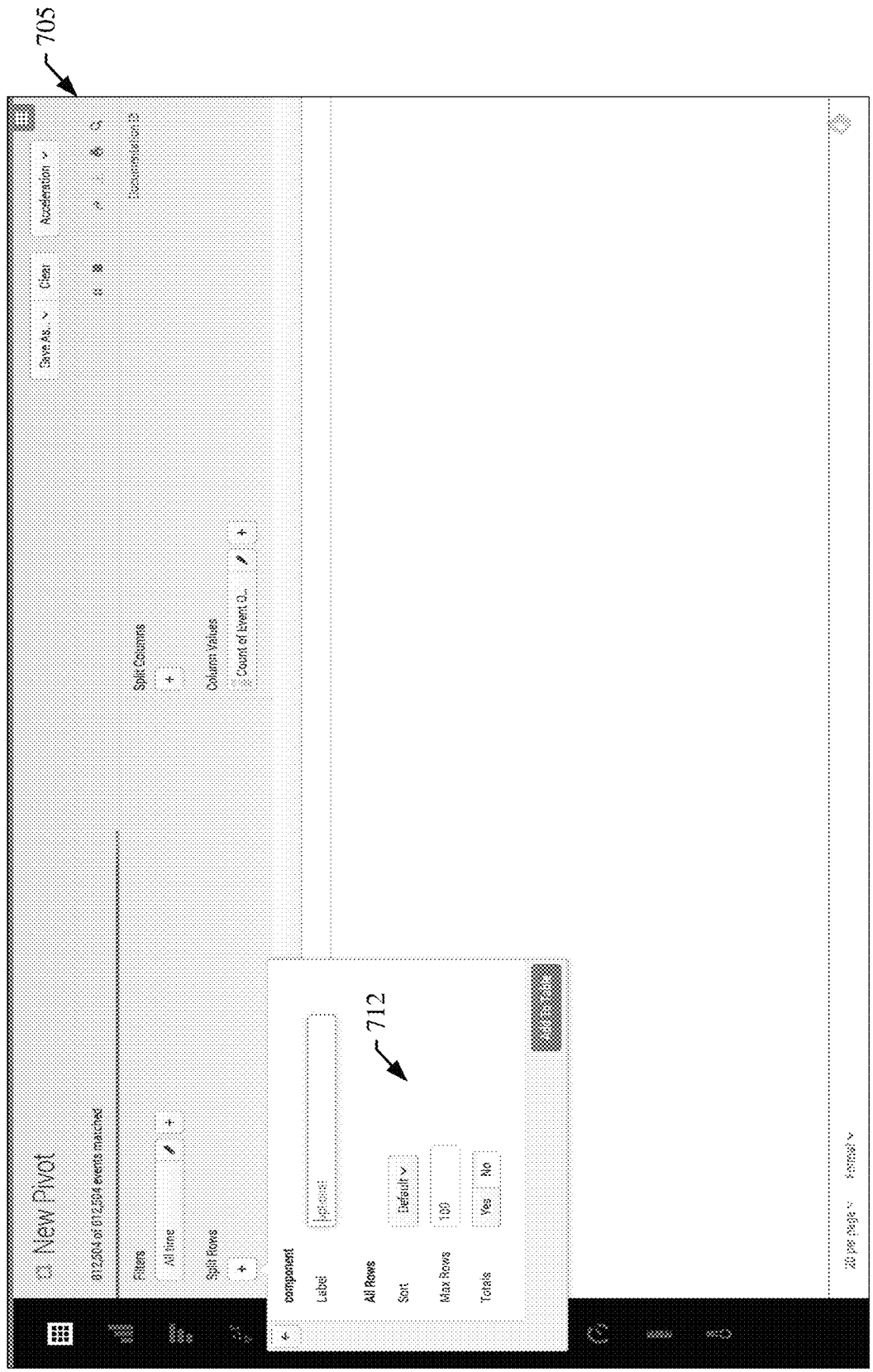

FIG. 7B illustrates an example graphical user interface screen (also called the pivot interface) 705 displaying the reporting application's "Report Editor" page. The screen may display interactive elements for defining various elements of a report. For example, the page includes a "Filters" element 706, a "Split Rows" element 707, a "Split Columns" element 708, and a "Column Values" element 709. The page may include a list of search results 711. In this example, the Split Rows element 707 is expanded, revealing a listing of fields 710 that can be used to define additional criteria (e.g., reporting criteria). The listing of fields 710 may correspond to the selected fields (attributes). That is, the listing of fields 710 may list only the fields previously selected, either automatically and/or manually by a user. FIG. 7C illustrates a formatting dialogue 712 that may be displayed upon selecting a field from the listing of fields 710. The dialogue can be used to format the display of the results of the selection (e.g., label the column to be displayed as "component").

Figure 7D:
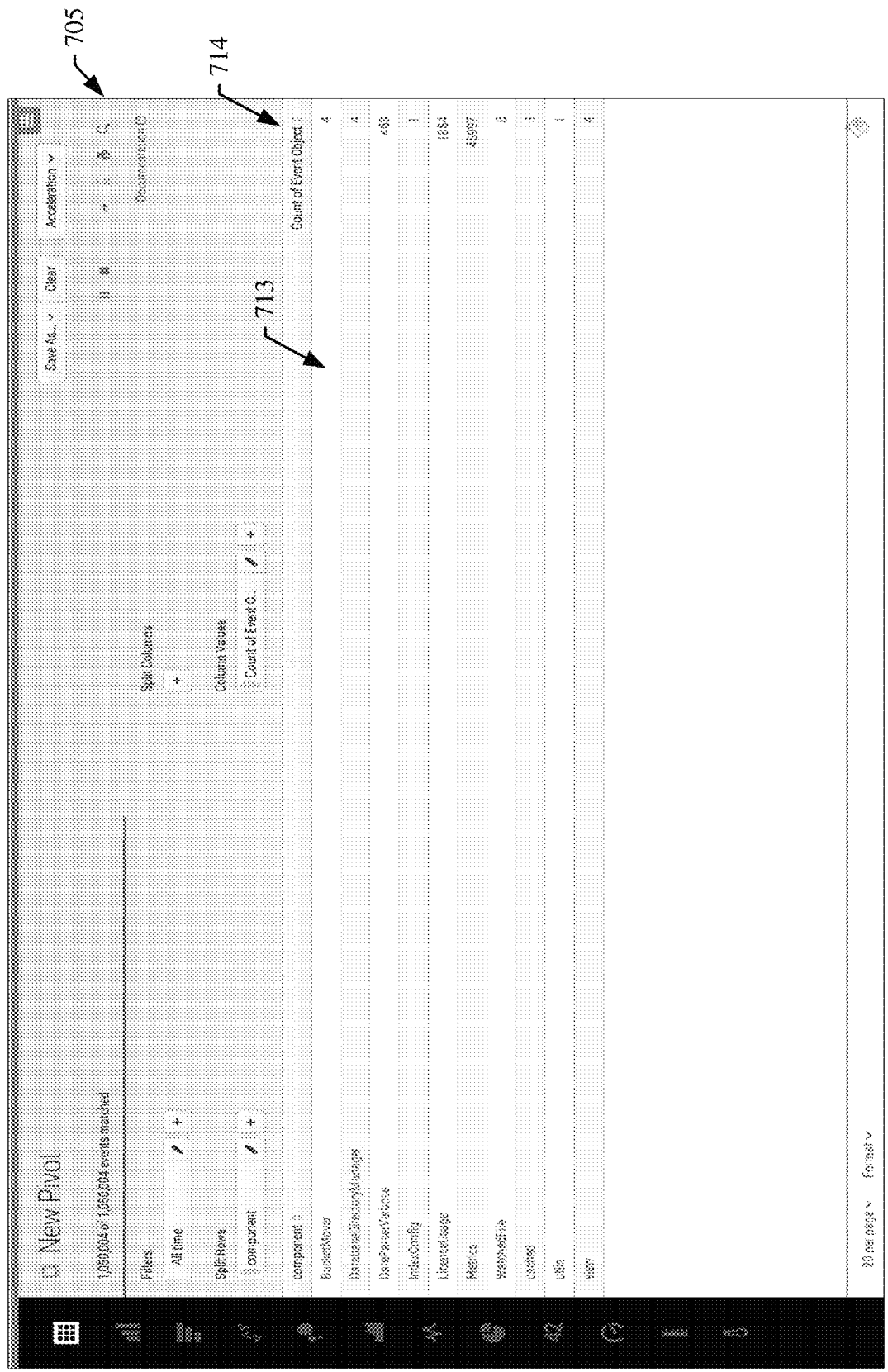

FIG. 7D illustrates an example graphical user interface screen 705 including a table of results 713 based on the selected criteria including splitting the rows by the "component" field. A column 714 having an associated count for each component listed in the table may be displayed that indicates an aggregate count of the number of times that the particular field-value pair (e.g., the value in a row) occurs in the set of events responsive to the initial search query.

Figure 14:

FIG. 14 illustrates an example graphical user interface screen 1400 that allows the user to filter search results and to perform statistical analysis on values extracted from specific fields in the set of events. In this example, the top ten product names ranked by price are selected as a filter 1401 that causes the display of the ten most popular products sorted by price. Each row is displayed by product name and price 1402. This results in each product displayed in a column labeled "product name" along with an associated price in a column labeled "price" 1406. Statistical analysis of other fields in the events associated with the ten most popular products have been specified as column values 1403. A count of the number of successful purchases for each product is displayed in column 1404. This statistics may be produced by filtering the search results by the product name, finding all occurrences of a successful purchase in a field within the events and generating a total of the number of occurrences. A sum of the total sales is displayed in column 1405, which is a result of the multiplication of the price and the number of successful purchases for each product.

Figure 15:
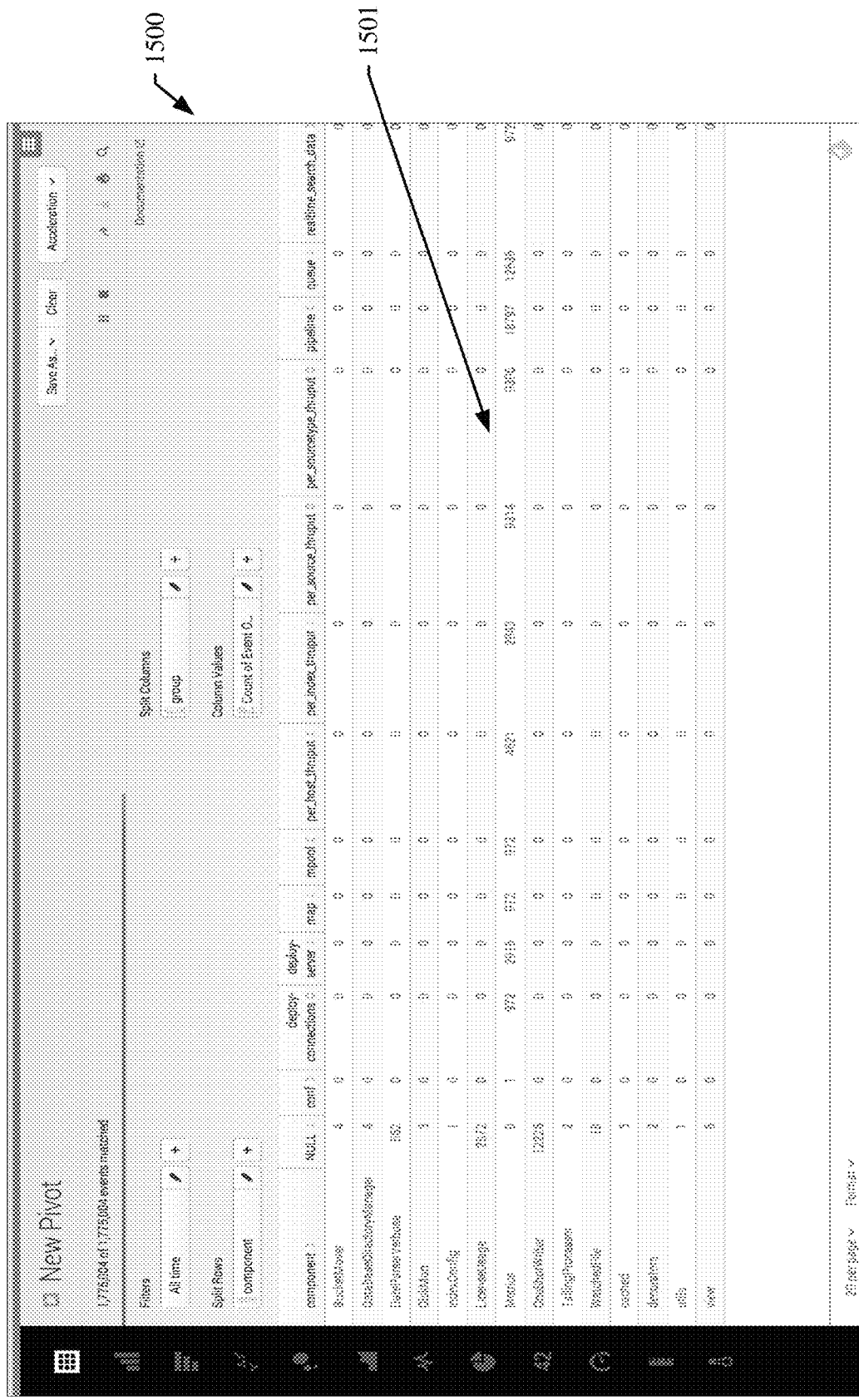
FIGS. 15-17 illustrate example visualizations generated by a reporting application in accordance with the disclosed embodiments.
Figure 16:
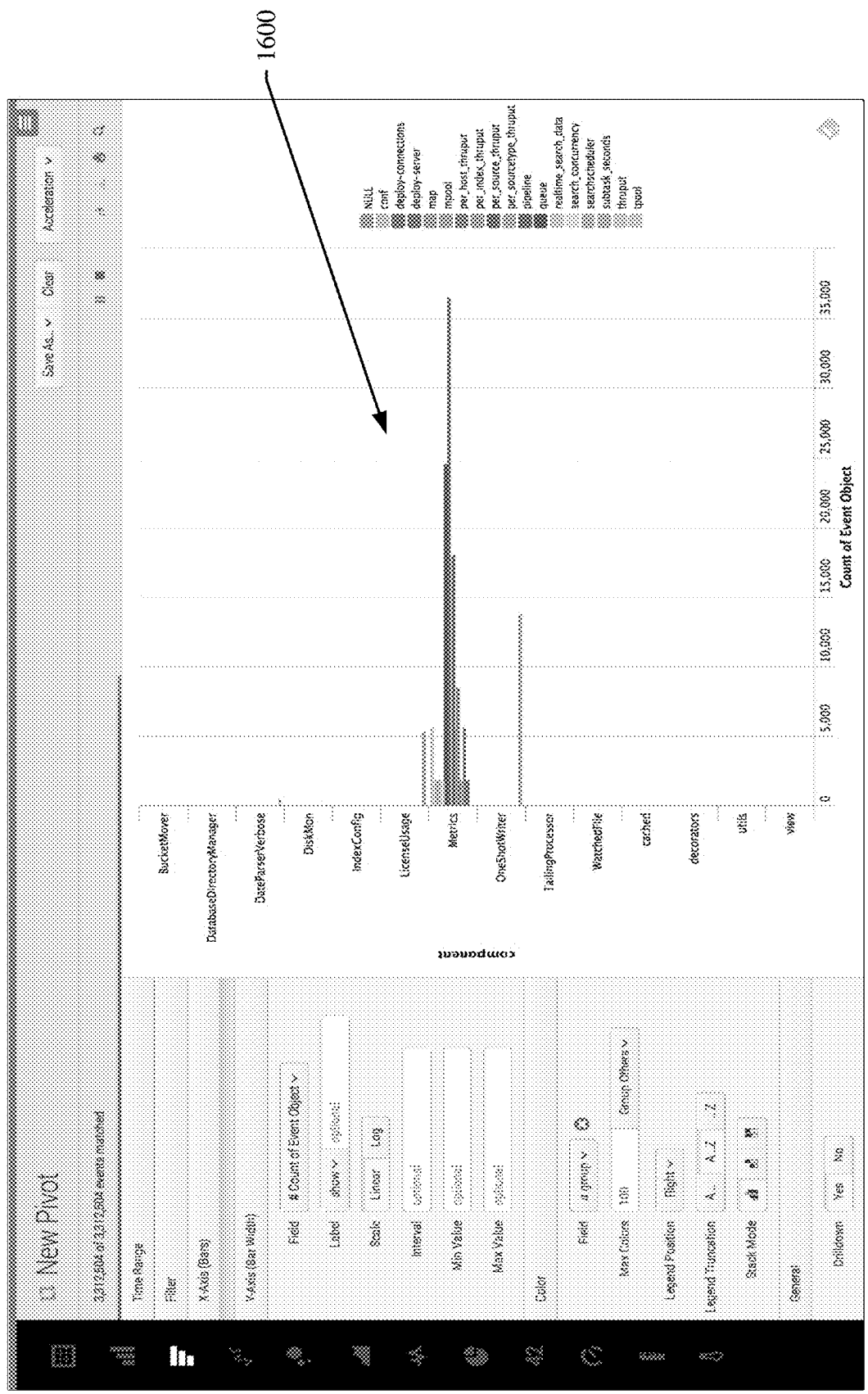
Figure 17:
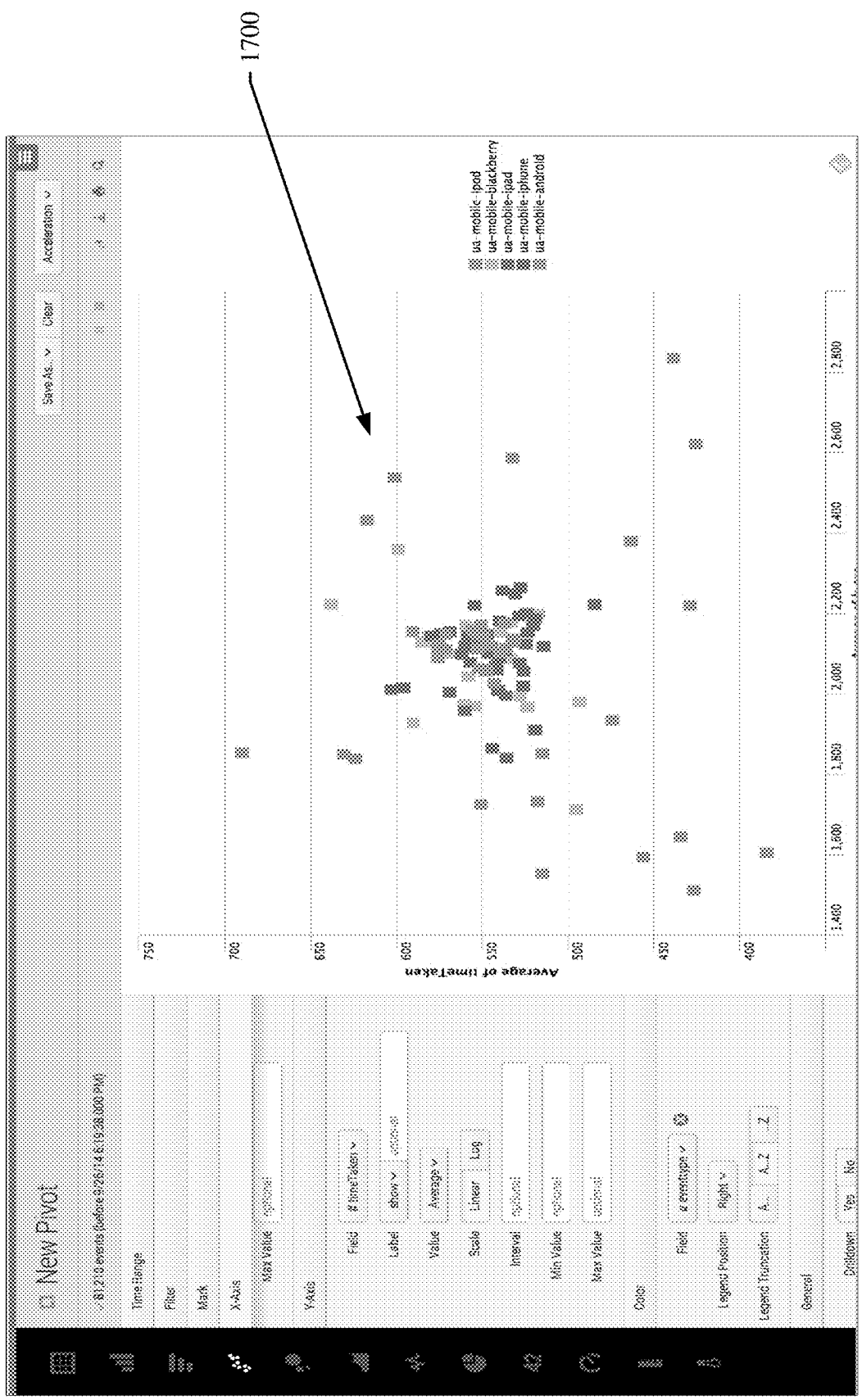

The reporting application allows the user to create graphical visualizations of the statistics generated for a report. For example, FIG. 15 illustrates an example graphical user interface 1500 that displays a set of components and associated statistics 1501. The reporting application allows the user to select a visualization of the statistics in a graph (e.g., bar chart, scatter plot, area chart, line chart, pie chart, radial gauge, marker gauge, filler gauge, etc.). FIG. 16 illustrates an example of a bar chart visualization 1600 of an aspect of the statistical data 1501. FIG. 17 illustrates a scatter plot visualization 1700 of an aspect of the statistical data 1501.

2.10. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.10.1. Aggregation Technique

Figure 8:
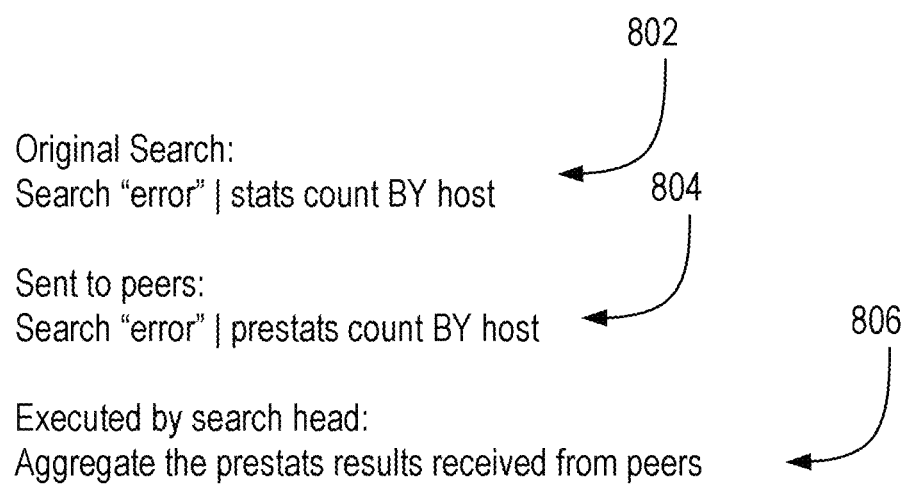
FIG. 8 illustrates an example search query received from a client and executed by search peers in accordance with the disclosed embodiments.

To facilitate faster query processing, a query can be structured such that multiple indexers perform the query in parallel, while aggregation of search results from the multiple indexers is performed locally at the search head. For example, FIG. 8 illustrates how a search query 802 received from a client at a search head 210 can split into two phases, including: (1) subtasks 804 (e.g., data retrieval or simple filtering) that may be performed in parallel by indexers 206 for execution, and (2) a search results aggregation operation 806 to be executed by the search head when the results are ultimately collected from the indexers.

During operation, upon receiving search query 802, a search head 210 determines that a portion of the operations involved with the search query may be performed locally by the search head. The search head modifies search query 802 by substituting "stats" (create aggregate statistics over results sets received from the indexers at the search head) with "prestats" (create statistics by the indexer from local results set) to produce search query 804, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.10.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.10.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.10.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.11. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 9A:
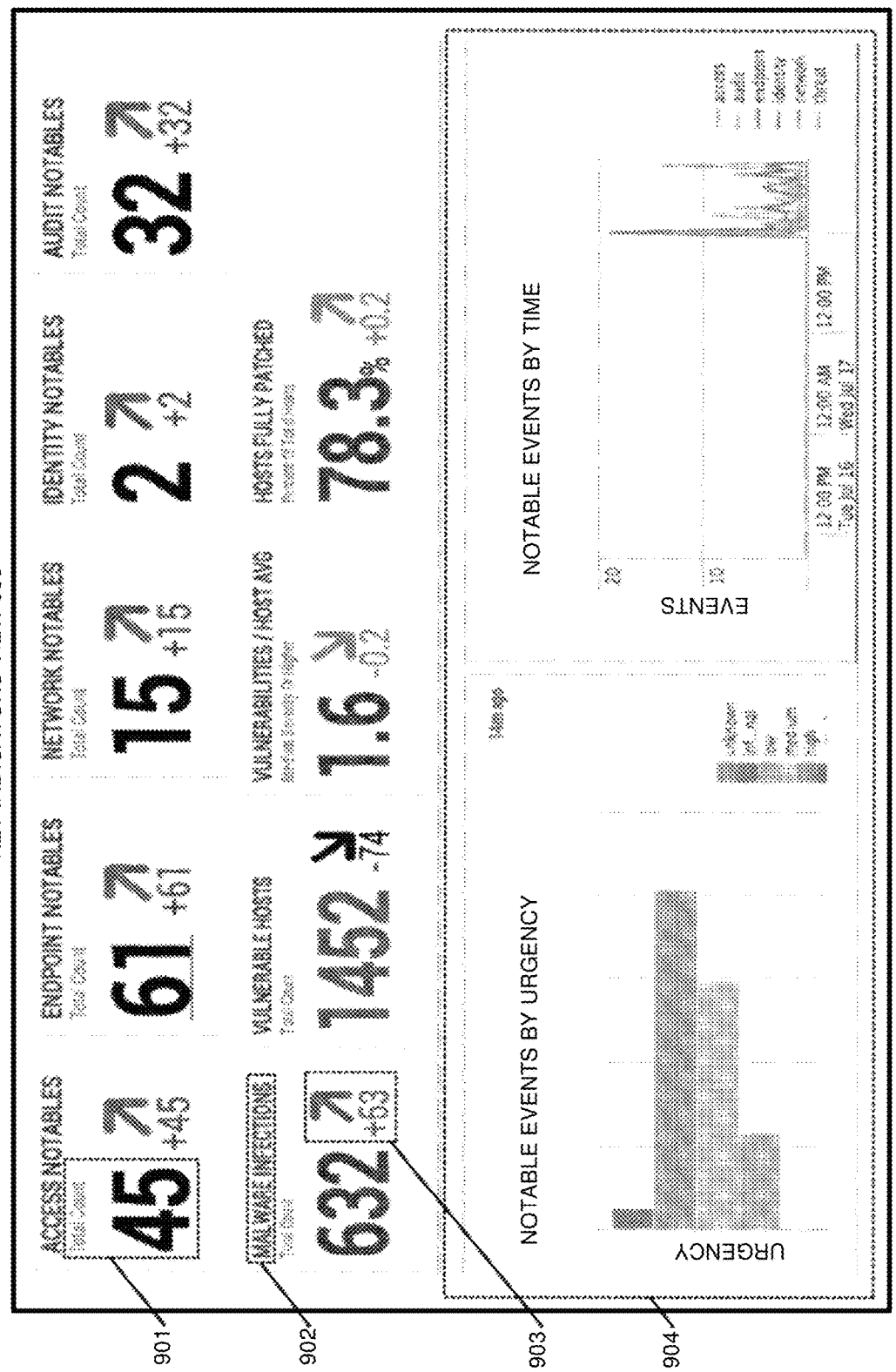
FIG. 9A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 9A illustrates an example key indicators view 900 that comprises a dashboard, which can display a value 901, for various security-related metrics, such as malware infections 902. It can also display a change in a metric value 903, which indicates that the number of malware infections increased by 63 during the preceding interval. Key indicators view 900 additionally displays a histogram panel 904 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 9B:
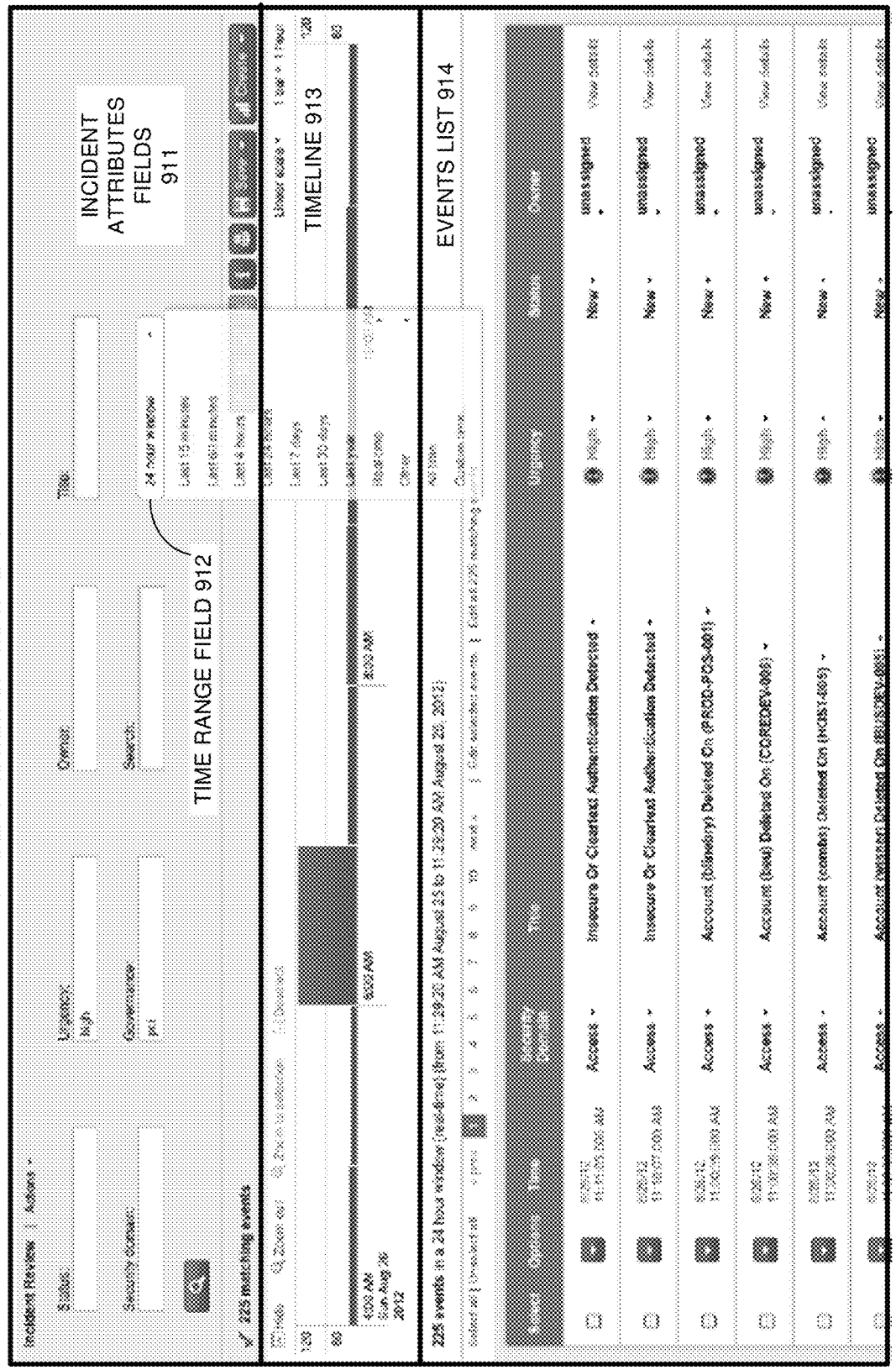
FIG. 9B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 9B illustrates an example incident review dashboard 910 that includes a set of incident attribute fields 911 that, for example, enables a user to specify a time range field 912 for the displayed events. It also includes a timeline 913 that graphically illustrates the number of incidents that occurred in time intervals over the selected time range. It additionally displays an events list 914 that enables a user to view a list of all of the notable events that match the criteria in the incident attributes fields 911. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.12. Data Center Monitoring

As mentioned above, the SPLUNK® ENTERPRISE platform provides various features that simplify the developers's task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

Figure 9C:
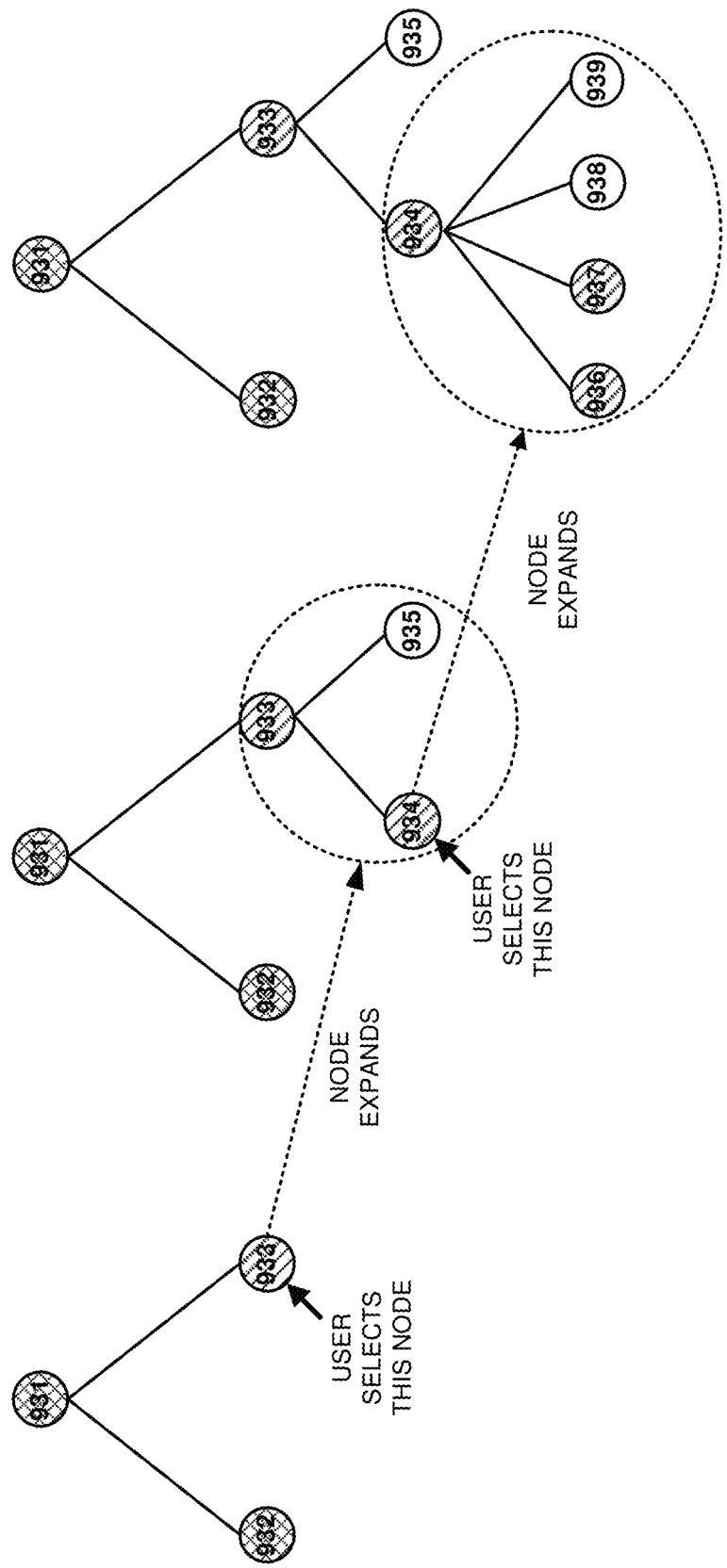
FIG. 9C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 9D:
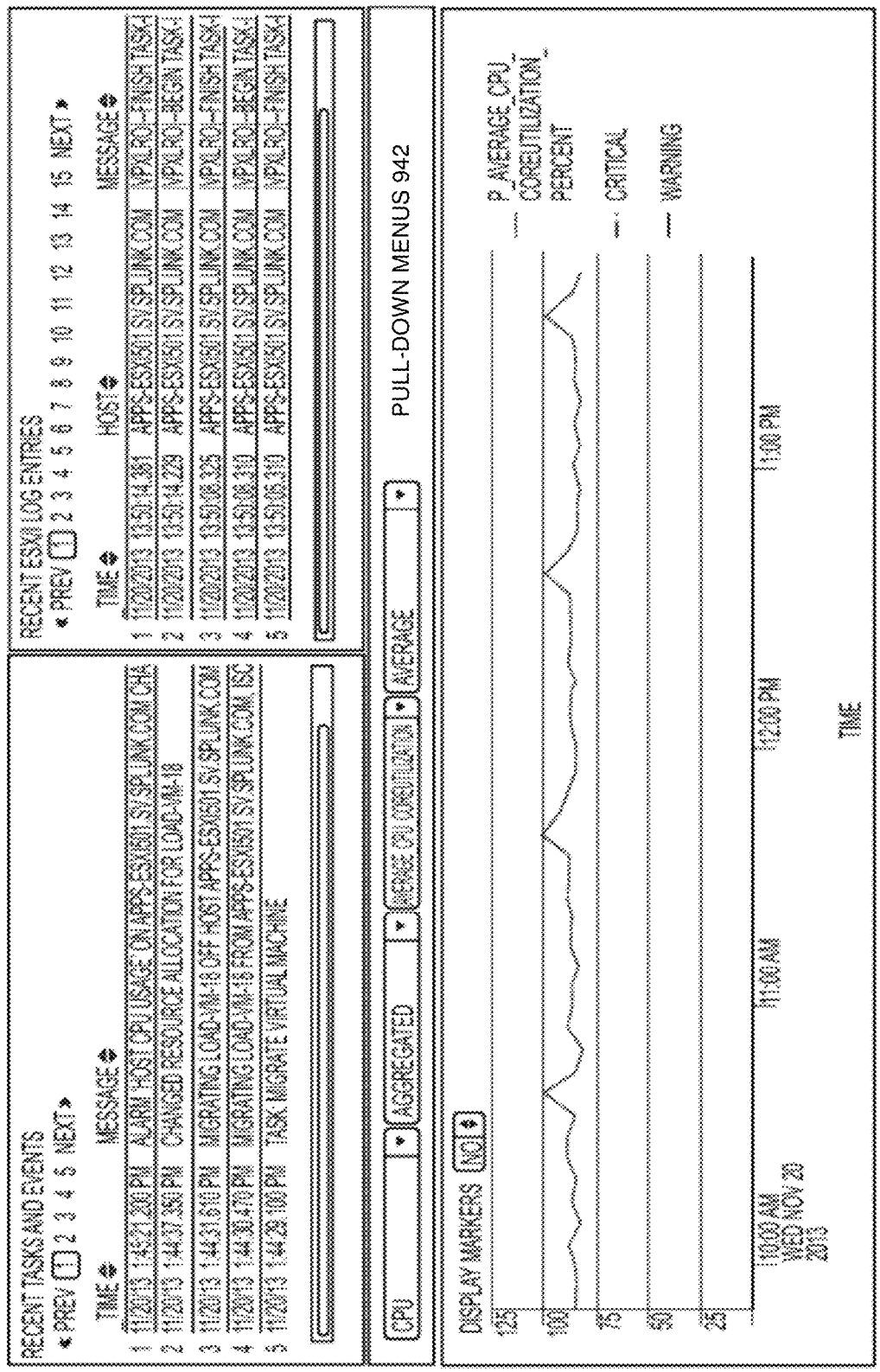
FIG. 9D illustrates a user interface screen displaying both log data and performance data in accordance with the disclosed embodiments.

The SPLUNK® APP FOR VMWARE® also provides a user interface that enables a user to select a specific time range and then view heterogeneous data comprising events, log data, and associated performance metrics for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.13. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 10:
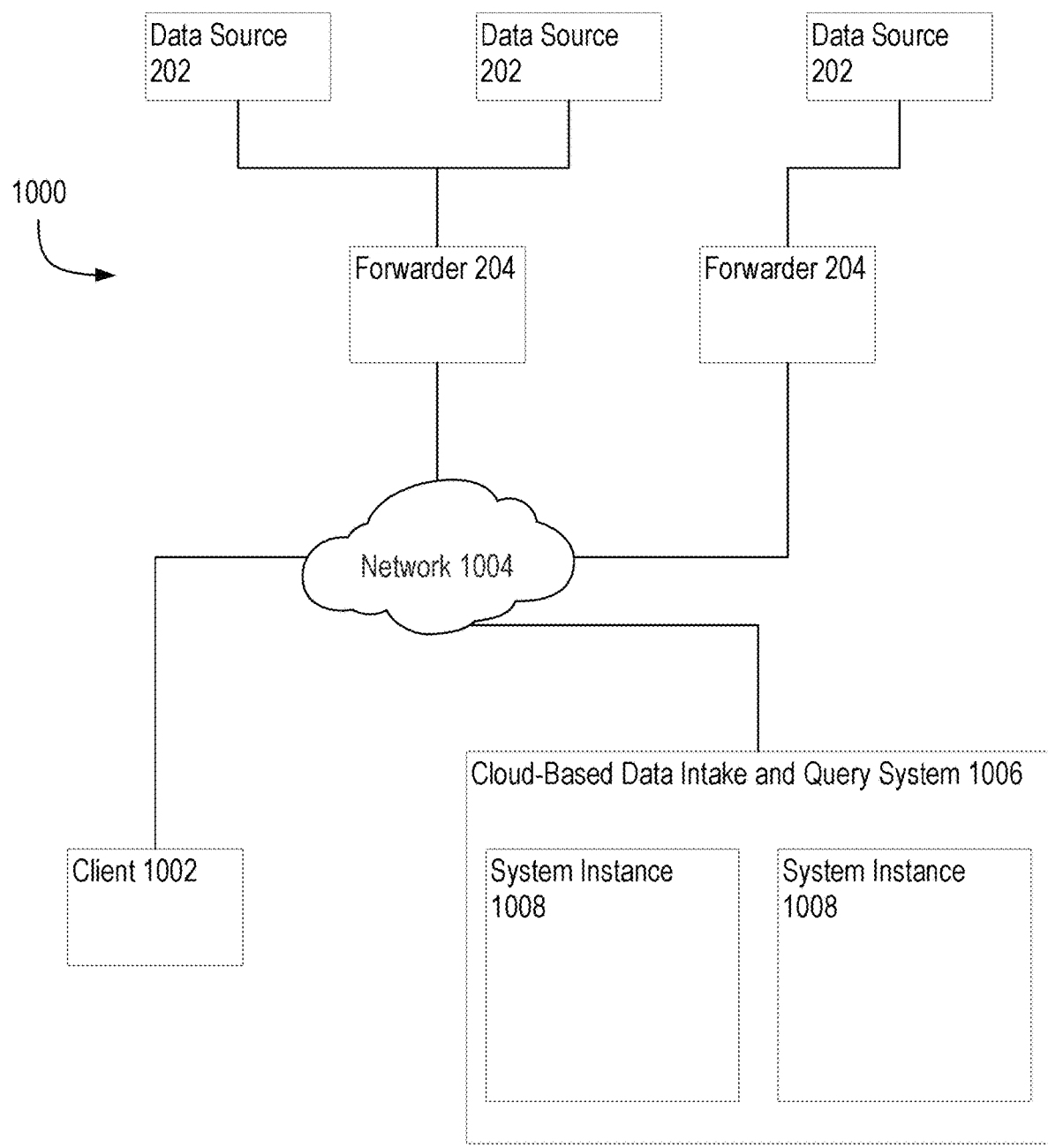
FIG. 10 illustrates a block diagram of an example cloud-based data intake and query system in which an embodiment may be implemented.

FIG. 10 illustrates a block diagram of an example cloud-based data intake and query system. Similar to the system of FIG. 2, the networked computer system 1000 includes input data sources 202 and forwarders 204. These input data sources and forwarders may be in a subscriber's private computing environment. Alternatively, they might be directly managed by the service provider as part of the cloud service. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.14. Searching Externally Archived Data

Figure 11:
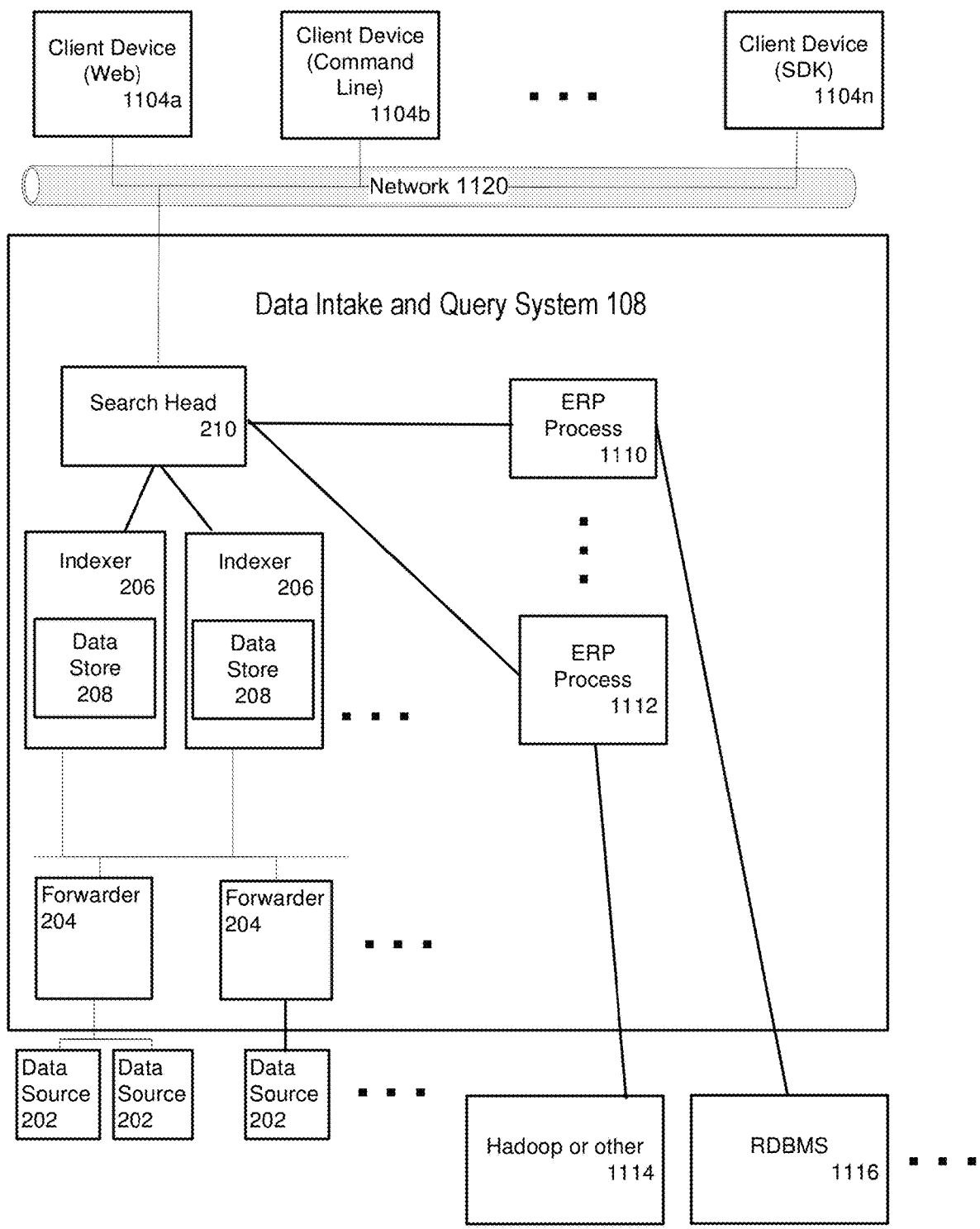
FIG. 11 illustrates a block diagram of an example data intake and query system that performs searches across external data systems in accordance with the disclosed embodiments.

FIG. 11 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 1104 over network connections 1120. As discussed above, the data intake and query system 108 may reside in an enterprise location, in the cloud, etc. FIG. 11 illustrates that multiple client devices 1104a, 1104b, . . . , 1104n may communicate with the data intake and query system 108. The client devices 1104 may communicate with the data intake and query system using a variety of connections. For example, one client device in FIG. 11 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 1104 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 1110, 1112.

FIG. 11 shows two ERP processes 1110, 1112 that connect to respective remote (external) virtual indices, which are indicated as a Hadoop or another system 1114 (e.g., Amazon S3, Amazon EMR, other Hadoop Compatible File Systems (HCFS), etc.) and a relational database management system (RDBMS) 1116. Other virtual indices may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1110, 1112 receive a search request from the search head 210. The search head may optimize the received search request for execution at the respective external virtual index. Alternatively, the ERP process may receive a search request as a result of analysis performed by the search head or by a different system process. The ERP processes 1110, 1112 can communicate with the search head 210 via conventional input/output routines (e.g., standard in/standard out, etc.). In this way, the ERP process receives the search request from a client device such that the search request may be efficiently executed at the corresponding external virtual index.

The ERP processes 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate search requests in the protocol and syntax of the respective virtual indices 1114, 1116, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.14.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the]streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One examplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.14. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

3.0. Technology Add-on Control Interface

A data input and query system (DIQ) such as data input and query system 108 of FIGS. 1 and 2, which may operate as an event processing system (EPS), may be employed in many operating environments and process a wide variety of data from a wide variety of sources. A DIQ embodiment may employ a datastore of configuration and control data to direct the automated processing it performs. The source type definition data discussed earlier, e.g., in § 2.5.2 Parsing, is but one example of the type of configuration and control data an embodiment may enable and utilize. A DIQ embodiment may permit and enable user customization and specification of configuration and control data to thereby effect control over the automatic operations of the DIQ, whether those automatic operations may be routine and repetitive or of an ad hoc nature such as in response to a specific user request. A DIQ embodiment may implement a user-facing control mechanism that permits the user, such as an administrator, to understand and alter the automatic operation of the DIQ. Such a control mechanism in an embodiment may, for example, expose user interface elements, perhaps via a GUI, to enable a user to view control data representations and to signal the addition, change, and deletion of certain control data. An embodiment of a control mechanism may serve as a control console and enable a user, such as an administrator, to change control data in a way so as to have an immediate effect on the operation of the DIQ. An embodiment of a control mechanism may enable a user to develop and stage possibly complex control data that may have an immediate effect upon completion or have effect at a later time. An embodiment of a control mechanism may enable the storage of control data in different forms where different forms may be appropriate or optimized for different uses. Such different uses may include, for example, immediate control of DIQ operation, future control of DIQ operation pending activation, control information management and administration, archiving, and transport, transmission, or distribution.

An embodiment may provide a robust capability for a user to control the operation of the DIQ in regards to receiving, collecting, and processing data from a particular interesting data source. An embodiment may provide a user control mechanism that presents the user with a modular, package, or project paradigm view of control data related to a particular data source. A control mechanism embodiment for a DIQ may be able to automatically generate detailed configuration control information needed for operation with a particular data source from more general information provided by a user about the data source.

Figure 18:
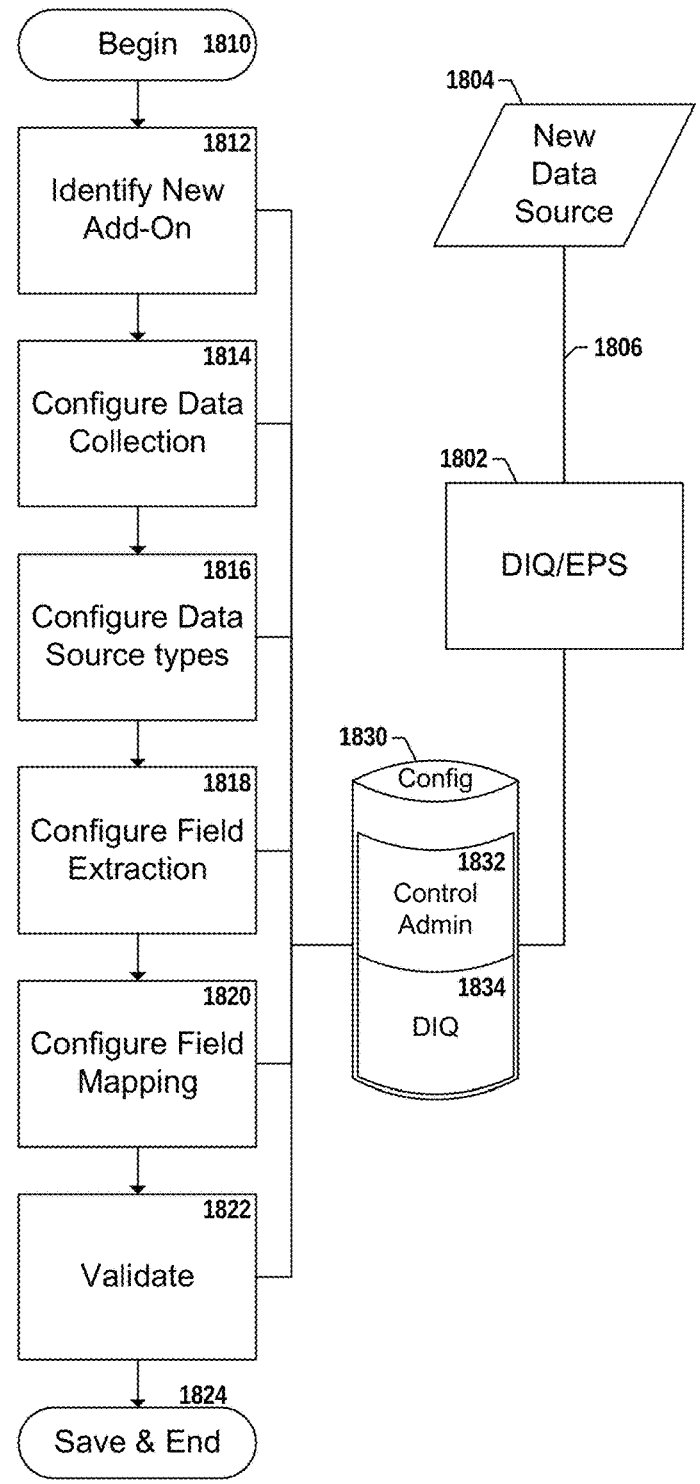
FIG. 18 illustrates a block diagram for a method of a user control interface related to data sources of a data input and query system.

FIG. 18 illustrates a block diagram for a method of a user control interface related to data sources of a data input and query system. Process 1800 begins at block 1810. In an embodiment, a user interface display, presentation, screen, page, or the like, of an introductory nature may be displayed as part of the processing of block 1810. In an embodiment, the processing of block 1810 includes receiving control from a preceding process which may include receiving parameter data, context data, and the like. In method 1800, processing proceeds to block 1812 where a new technology add-on (TA) is identified.

In one embodiment, a technology add-on (TA) is a collection of control and configuration data for a DIQ that enables the DIQ to ingest and/or provide search query functionality for data originating from a particular data source or data source technology (e.g., a fictitious example of all ACME brand network routers in the Pro Series model line). The TA in one embodiment may include an identifier for the TA and parameter data controlling data ingestion operations of the DIQ. The TA in an embodiment may further include user-written computer language code to similarly control data ingestion operations. The TA in an embodiment may include parameter data and user written computer language code used to effect automatic search operation aspects of the DIQ. The scope and content of a technology adapter can vary according to the embodiment, and may vary, for example, in relation to the capabilities of the DIQ and in relation to the extent of user control desired.

The collection of control and configuration data that forms the TA may be stored in a configuration and control data store of a DIQ such as data store 1830 of FIG. 18. Configuration and control data store 1830 is shown to include a control administration portion 1832 and a DIQ control portion 1834. DIQ control portion 1834 in an embodiment may include control data that is in active use by the DIQ to control its data input and search operations, and may be stored in a fashion and with devices that provide high performance, for example. Control administration portion 1832 in an embodiment may include control data that is inactive, incomplete, under development, awaiting activation, or the like, or that is related to management and administration of the DIQ, including the management and administration of the configuration and control data itself, rather than to the direct control of data input and query operational aspects, for example. An embodiment may distinguish various portions of its control data store (e.g., 1830) and may make such distinctions physically, logically, organizationally, representationally, and the like. An embodiment need not make such distinctions. The number of portions, and the scope and content of each, may vary from embodiment to embodiment.

The collection of control and configuration data that forms the TA in one embodiment is a logical collection. Various data within a TA may be included in the collection by value and by reference, directly and indirectly, stored locally and remotely, using one or more representations, formats, organizations, structures, access methods, and the like. In an embodiment, all of the data within a TA may be included by value such that the TA may be independent, stand-alone, or self-contained. In an embodiment, information about the relationship of the various data to the collection may be explicit and/or implied, and discernible to computing apparatus by data access and/or program logic. In one embodiment, the collection of control and configuration data that forms the TA can be represented in a data package that conforms to a particular TA packaging standard representation format. Such a data package may be standalone and portable, and useful for archiving or distributing a TA. Such a TA package may be an extension to an extensible DIQ or EPS system which includes support for recognition, adoption, installation, utilization, and the like, of the configuration and control data of a TA package/extension. In one embodiment a standard data package may be represented as a collection of key-value pairs. In one embodiment the standard data package may be represented as a .zip file that includes standardized folder and file names. In one embodiment, a standard data package may conform to a standard representation format promulgated by a standards body. In one embodiment, a standard data package may conform to a standard representation format specified by a DIQ provider. These are but a few examples of the types of data packages an embodiment may employ.

While possibly described or suggested herein in terms of immediate or near-term control of an active DIQ, and actively operating as an integral part of, or in conjunction with, an executing DIQ, one of skill will understand that embodiments may address configuration and control data of a TA package, module, component, extension or the like, that is developed on a standalone basis apart from the involvement of an actively operating or executing DIQ. Such an embodiment may be useful, for example, to an equipment manufacturer wishing to provide its customers with a TA to control the customer's own DIQ system so as to interface with and utilize machine data generated by the manufactured equipment. Such an embodiment may enable the equipment manufacturer to create a TA for distribution to customers without having or operating their own DIQ system solely to create a TA extension.

The processing of block 1812 in one embodiment may include presenting a user interface that enables a user to indicate or specify an identifier, name, or title, for a technology adapter (TA), and to capture the identification indicated by the user. The processing of block 1812 in one embodiment may include automatically generating a recommended name for the TA and possibly presenting it to the user for confirmation or change. In an embodiment, the processing of block 1812 may address data or metadata for a TA beyond identification. For example, an embodiment may process information at block 1812 for controlling the appearance generated by the DIQ for TA-related representations in user interfaces.

At block 1814, control/configuration information related to data collection is processed. The data collection control information in an embodiment may be related to controlling the operation of the DIQ to actively or passively solicit or receive data from a data source associated with the TA. In an embodiment, the data collection control information processed at block 1814 may emphasize controlling operations of the DIQ to get data into the DIQ from a data source. The processing of block 1814 in one embodiment may include presenting a user interface that enables a user to indicate or specify information to locate, activate, open, read, otherwise access, or the like, a source of computer readable machine data. The processing of block 1814 in one embodiment may include recognizing data collection control information, or aspects thereof, that may have been passed or carried forward from another computer process or method, perhaps as the result of the processing of block 1810, and possibly presenting recognized information to the user for confirmation or change. In an embodiment, processing of block 1814 may include identifying a source of sample data for the data source that can be accessed independently of the data source itself, such as a disk file.

At block 1816, control/configuration information is addressed related to data source types the DIQ will process. In an embodiment, a TA may be limited to a single source type. In an embodiment, a TA may address multiple source types. In an embodiment, the processing of block 1816 may include the presentation of an interactive user interface to variously add, edit, delete, or upload sample file data related to, one or more source types. Source types, source type definitions/control information, and their use to control DIQ operations of indexers, for example, are discussed in greater detail elsewhere (see, for example, section 2.5.2. PARSING).

At block 1818, information that controls field extraction operations of the DIQ is processed. As is possible in an embodiment for other TA configuration and control information, the field extraction control information processing of block 1818 may be relevant to controlling DIQ operations during input (e.g. indexing) and search (e.g. late binding schema). In an embodiment, the processing of block 1818 may present an interactive user interface for configuring control information related to field extraction for the TA. In an embodiment, the processing of block 1818 may include automatically getting or accessing sample data related to the data source of the TA, determining likely field locations and types, and grouping the sample data to generate an extraction model for the groups to address all or substantially all of the sample data. In an embodiment, the processing of block 1818 may include displaying an interactive user interface that reflects the computer-generated extraction model, possibly for user viewing, confirmation, or editing.

At block 1820, information that controls DIQ recognition or processing for data normalization is processed. In one embodiment, the processing of block 1820 may include the presentation of an interactive user interface that enables a user to view, change, delete, or otherwise interact with information that controls mapping data source data (e.g., a field extracted according to the extraction model) to an identification, representation, scale, or the like, that is normalized, standardized, canonical, model-based, or the like. In an embodiment, information presented in the interactive user interface may include automatically generated computer mappings of one or more fields, for example, possibly for user viewing, confirmation, or editing.

At block 1822, control information for a TA that has been viewed, generated, entered, edited, updated, or the like, as described in relation to any one or more of the previously discussed processing blocks of method 1800, may undergo a validation process. In an embodiment, the information to determine, define, or configure the contents of a TA control and configuration data collection may be tested for quality, compliance, validity, or the like, using a set of rules evaluated by the computing machine(s) performing the processing of block 1822. In an embodiment, such validation rules may be grouped into one or more categories, sets, groups, lists, topics, collections, or the like, and the rules may be selectively included or excluded from the validation process on a group-wide basis. In an embodiment, one or more results of the validation process may be presented in a user interface for user viewing, confirmation, acceptance, or action.

At block 1824, the TA may be saved or otherwise stored and the processing of method 1800 ends. In an embodiment, the saving or storing processing of block 1824 may include storage of a data collection representation for the TA in a configuration and control data store 1830. In an embodiment, any portion including all of the configuration control data for a TA may be reflected in either, both, or any combination of control administration portion 1832 and/or DIQ portion 1834 of configuration and control data store 1830. DIQ control information of the TA reflected in data store 1830 is then accessed by DIQ/EPS 1802 to establish an operational connection 1806 with new data source 1804, and to control operations attendant thereto and thereafter. In the figures that are next discussed, examples of user interface displays that may be useful in the processing of method 1800 are illustrated.

Figure 19:
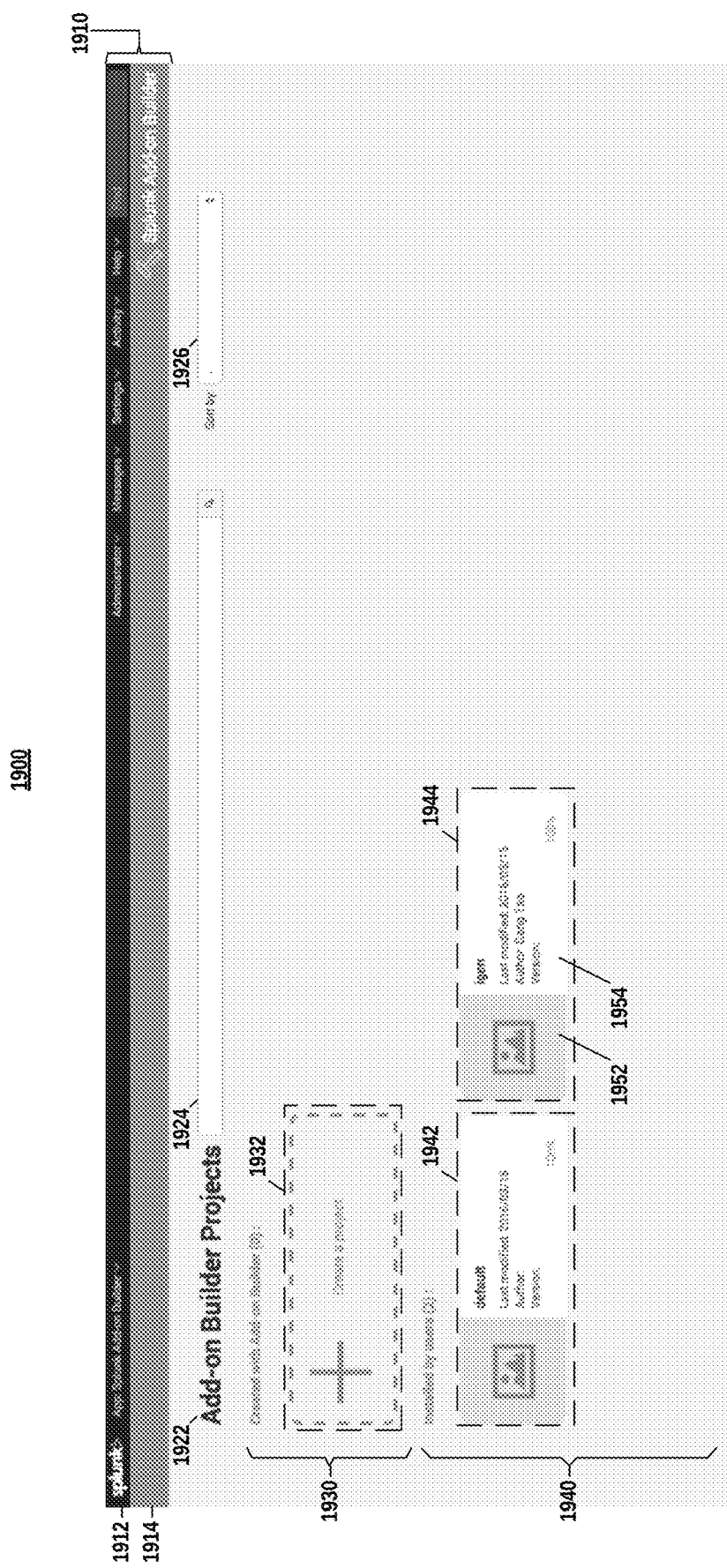
FIG. 19 illustrates a starting page display of a user control interface embodiment.

FIG. 19 illustrates a starting page display of a user control interface embodiment. Interface 1900 illustrates a user interface display as it might appear for an embodiment during the processing of block 1810 of FIG. 18. Interface 1900 of FIG. 19 is shown to include a header portion 1910 which is shown to include system title and menubar 1912 and application title and menubar 1914. Interface 1900 represents a possible embodiment for a landing page as might be used when a user requests navigation to a section of the control interface addressing technology add-ons; particularly when the technology add-ons are presented to the user for management using a project, module, extension, or package paradigm.

Interface 1900 is further shown to include page title 1922, "Add on Builder Projects", search/filter component 1924, and sort component 1926. Search/filter component 1924 may be interactive enabling a user to specify or indicate filter criteria that will limit technology adapter (TA) configuration and control data projects appearing on the interface. In an embodiment, search/filter criteria may be search patterns including wildcards to be matched to TA names/identifiers. In an embodiment, the search/filter criteria may include search patterns related to identifying aspects or metadata about a TA other than its name. Sort component 1926 may be interactive enabling a user to specify or indicate a sort criteria that will order the appearance of TA configuration and control data projects appearing on the interface. Interface 1900 is shown to further include new TA project area 1930 which may include a GUI component, region, area, tile, or the like, such as tile 1932 that enables a user to indicate a desire to engage processing to create a new TA. Interface 1900 is shown further to include existing TA project tile area 1940 which may include one or more GUI components, regions, areas, tiles, or the like, such as tiles 1942 in 1944, that each represent a TA. The tiles displayed in area 1940 may be subject to the content, settings, or values of search/filter component 1924 and sort component 1926. In an embodiment, a TA tile such as 1944 may include an iconic or graphical representation for the TA 1952 and an information area for the TA 1954 that may display definitional, identification, metadata, or the like for a TA. The displayed information of information area 1954 may include, for example, a TA name ("igen"), a last modified date ("2016 Mar. 15"), an author name ("Gang Tao"), a version number (not specified), and a completion percentage ("100%"). Each tile displayed in area 1940 may be interactive and enable a user to navigate to a portion of the interface that may permit a user to view, change, or delete configuration and control data for the TA.

Figure 20:
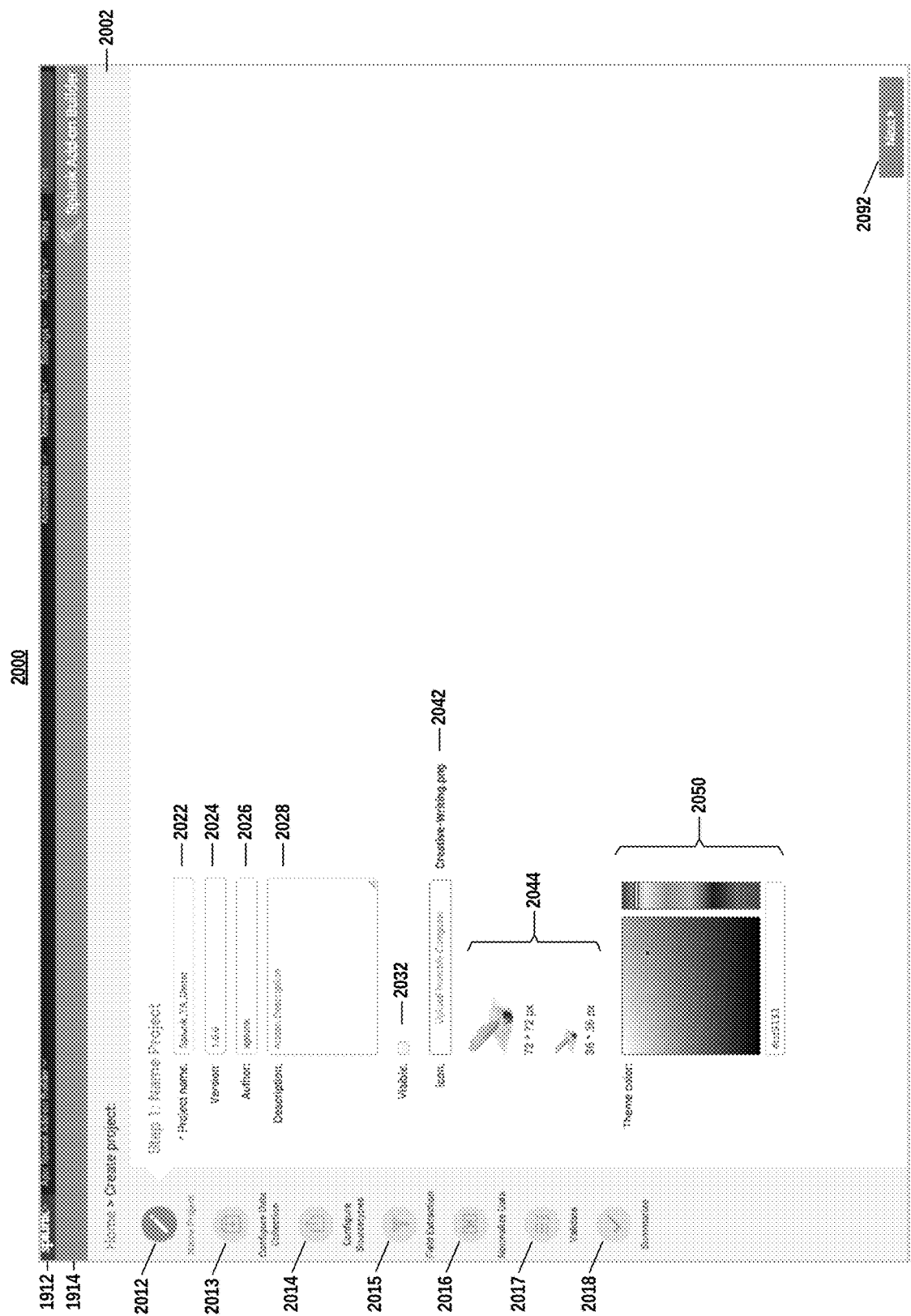
FIG. 20 illustrates a project creation page display of a user control interface embodiment.

FIG. 20 illustrates a project creation page display of a user control interface embodiment. Interface 2000 illustrates a user interface display as it might appear for an embodiment during the processing of block 1812 of FIG. 18. Interface 2000 of FIG. 20 is an example of an interface as may be the target of a navigation initiated by means of tile 1932 of interface 1900 of FIG. 19. Interface 2000 of FIG. 20 is shown to include project location and navigation bar 2002, TA control section navigation panel 2010, TA name component 2022, TA version component 2024, TA author component 2026, TA description component 2028, visibility component 2032, icon specification component 2042, icon display component 2044, color picker component 2050, and action button component 2092. TA control section navigation panel 2010 is shown to include TA name section component 2012, TA data collection section component 2013, TA source types section component 2014, TA field extraction section component 2015, TA normalize data section component 2016, TA validate section component 2017, and TA summarize section component 2018. Each of TA section components 2012 through 2018 may enable user interaction to indicate navigation to a corresponding section of a multi-section user interface in an embodiment. TA name section component 2012 is shown to be more pronounced than the other section components 2013 through 2018 to indicate that the TA name section component is the currently active section of the user interface and, accordingly, that interface 2000 may principally include TA name section content.

TA components 2022, 2024, 2026, and 2028, may each include a label and an interactive element enabling a user to indicate/specify values for a name/identifier, a version number/identifier, and author name/identifier, and a description, respectively. Visibility component 2032 may include a label and an interactive element enabling a user to specify a visibility selection for the TA. Icon specification component 2042 may include a label, an interactive element allowing a user to indicate the desire to engage processing to upload an icon file ("Upload from My Computer"), and an icon file identification element for displaying an icon file name ("Creative-Writing.png"). Icon display component 2044 may enable the display of the images for one or more previously uploaded icons. Color picker component 2050 may include a label and one or more interactive elements enabling a user to indicate the selection of a theme color that may be used to control the generation of displays or other outputs related to the TA. Action button component 2092 may enable user interaction to indicate confirmation, acceptance, completeness, acceptability, or the like of the TA name/identity-related information presented in the main body of interface 2000 and to indicate a desire to engage processing to save that information and to proceed to a logically or temporally subsequent TA interface section.

Figure 21:
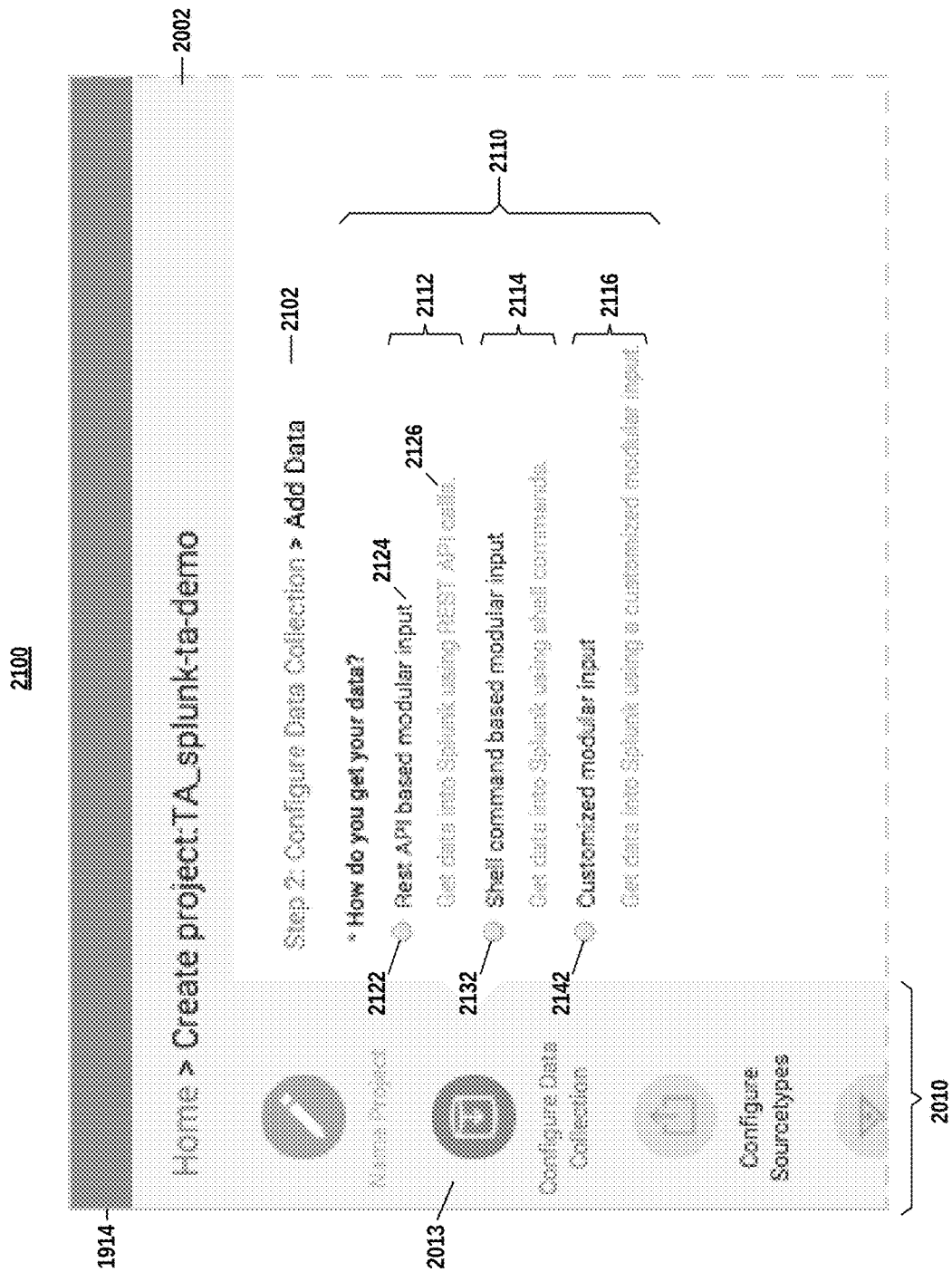
FIG. 21 illustrates a section of a data collection page of a user control interface embodiment.

FIG. 21 illustrates a section of a data collection page of a user control interface embodiment. Interface portion 2100 illustrates a user interface display as it might appear for an embodiment during the processing of block 1814 of FIG. 18. Interface 2100 of FIG. 21 is an example of an interface as may be the target of a navigation initiated by means of TA data collection section component 2013 or action button component 2092 of FIG. 20. TA data collection section component 2013 is shown to have a pronounced appearance among displayed section components to indicate that the TA data collection section component is the currently active section of the user interface and, accordingly, that interface portion 2100 may principally include TA data collection section content. Interface portion 2100 is shown to include TA location and navigation information bar 2102 and data input option area 2110. Data input option area is shown to include 3 input option list entry components 2112, 2114, and 2116. An option list entry component such as 2112, for example, is shown to include a selection indicator component (radio button 2122), an input option title 2124, and an input option description 2126. The 3 selection indicator components (radio buttons) 2122, 2132, and 2142 correspond to supported input options of the embodiment: "Rest API based modular input", "Shell command based modular input", and "Customized modular input", respectively.

Figure 22:
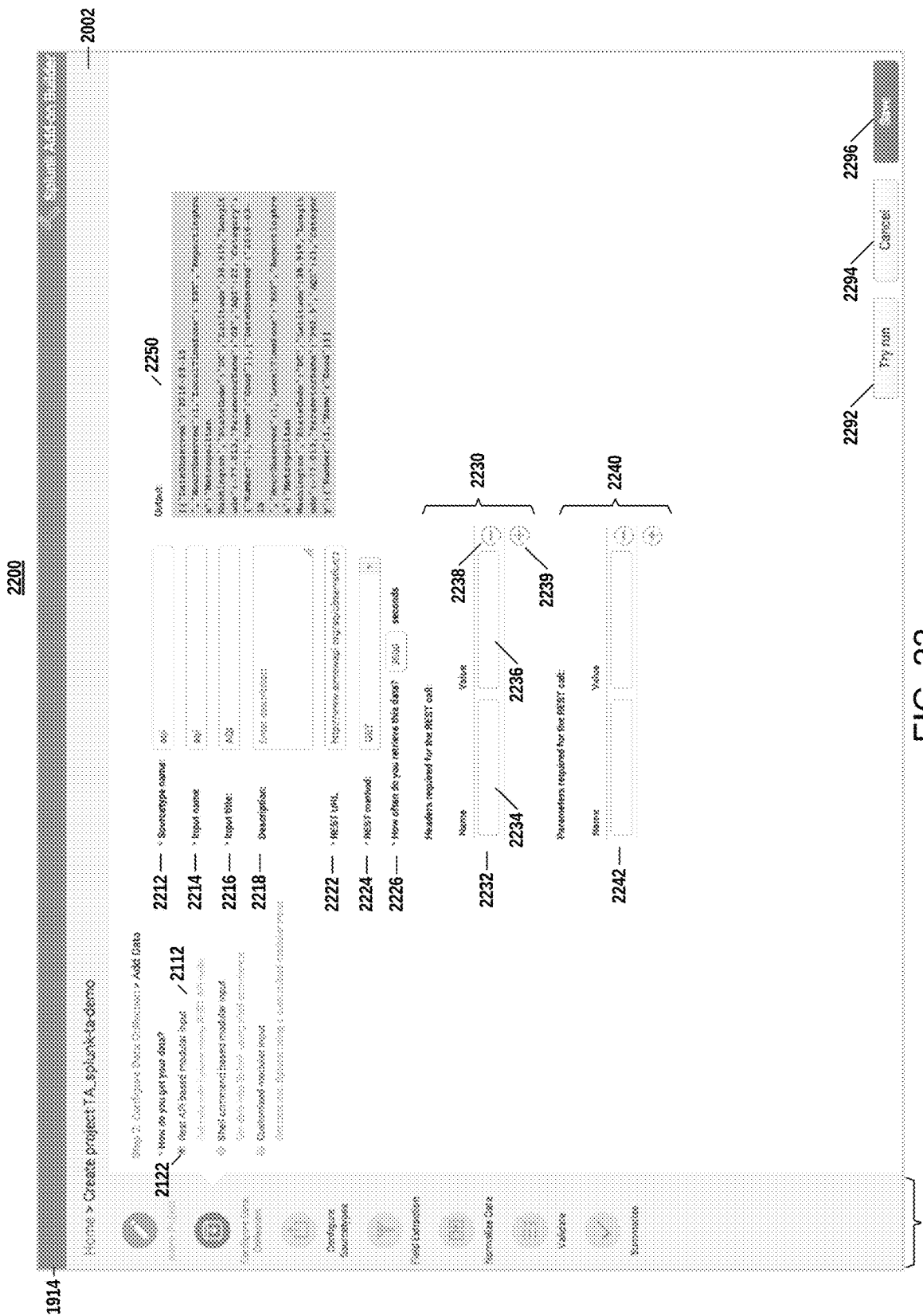
FIG. 22 illustrates a data collection page display of a user control interface embodiment specialized to a first example of a data collection approach in one embodiment.

FIG. 22 illustrates a data collection page display of a user control interface embodiment specialized to a first example of a data collection approach in one embodiment. Interface 2200 illustrates a user interface display as it might appear for an embodiment during the processing of block 1814 of FIG. 18. Interface 2200 of FIG. 22 is an example of an interface display as may result from a user interaction with selection indicator component (radio button) 2122 of interface portion 2100 of FIG. 21 to indicate "Rest API based modular input" as the selected data input option for the current TA. Notably interface portion 2100 of FIG. 21 substantially appears as the upper left portion of interface 2200 of FIG. 22. The remainder of the main body of interface 2200 is specialized in an embodiment in accordance with the user selection of 2122. The main body of interface 2200 is shown to include source type name component 2212, input name component 2214, input title component 2216, description component 2218, REST URL component 2222, REST method component 2224, retrieval frequency component 2226, REST header section component 2230, REST parameter section component 2240, and action buttons 2292, 2294, and 2296.

Source type name component 2212 is shown to include a label and an interactive element enabling a user to indicate a source type name (e.g., "aqi") as may be associated with data processed for input by a DIQ under the control of the TA. Input name component 2214 is shown to include a label and an interactive element enabling a user to indicate a name of the input (e.g., "aqi") to include with the configuration and control data of the TA. Input title component 2216 is shown to include a label and an interactive element enabling a user to indicate a title for the input (e.g., "AQI") to include with the configuration and control data of the TA. Description component 2218 is shown to include a label and an interactive element enabling a user to indicate the text description for the input to be included with the configuration and control data of the TA. REST URL component 2222 is shown to include a label and an interactive element enabling a user to specify the URL location of the REST interface that may be exercised to get data from the data source. REST method component 2224 is shown to include a label and an interactive element (e.g. a combo box with a drop-down list) enabling a user to specify a method of the REST interface to exercise. Retrieval frequency component 2226 is shown to include a label (here, shown in question form, "How often do you retrieve this data?"), an interactive element enabling a user to specify a value for a retrieval frequency (e.g., 3600), and a units indication for the retrieval frequency value ("seconds").

REST header section component 2230 is shown to include header entry 2232 and add entry button 2239. Header entry 2232 is further shown to include interactive element 2234 enabling a user to specify the name component of a name-value pair, interactive element 2236 enabling a user to specify the value component of a name-value pair, and delete button 2238 enabling a user to delete entry 2232.

REST parameter section component 2240 is shown to include parallel contents to header section component 2230 including, for example, entry component 2242 enabling a user to specify a name component and a value component for a name-value pair, or to delete the entry.

Action button 2292 enables a user to indicate the desire to engage processing to make an attempt to exercise the REST interface in accordance with the information then displayed by interface 2200. In response to such a user interaction the computing machine may exercise the interface accordingly and present the result of the attempt in output display area 2250. Action button 2294 enables a user to indicate the desire to engage processing to cancel the effects of recent interaction with interface 2200 and possibly clear the interface display of any user entered values. Action button 2296 enables a user to indicate a desire to engage processing to save the configuration and control information for a REST data input as part of the TA. Such an interaction with action button 2296 may result in saving the configuration and control data for the REST data input among the data of the configuration control data store 1830 of FIG. 18, for example.

Figure 23:
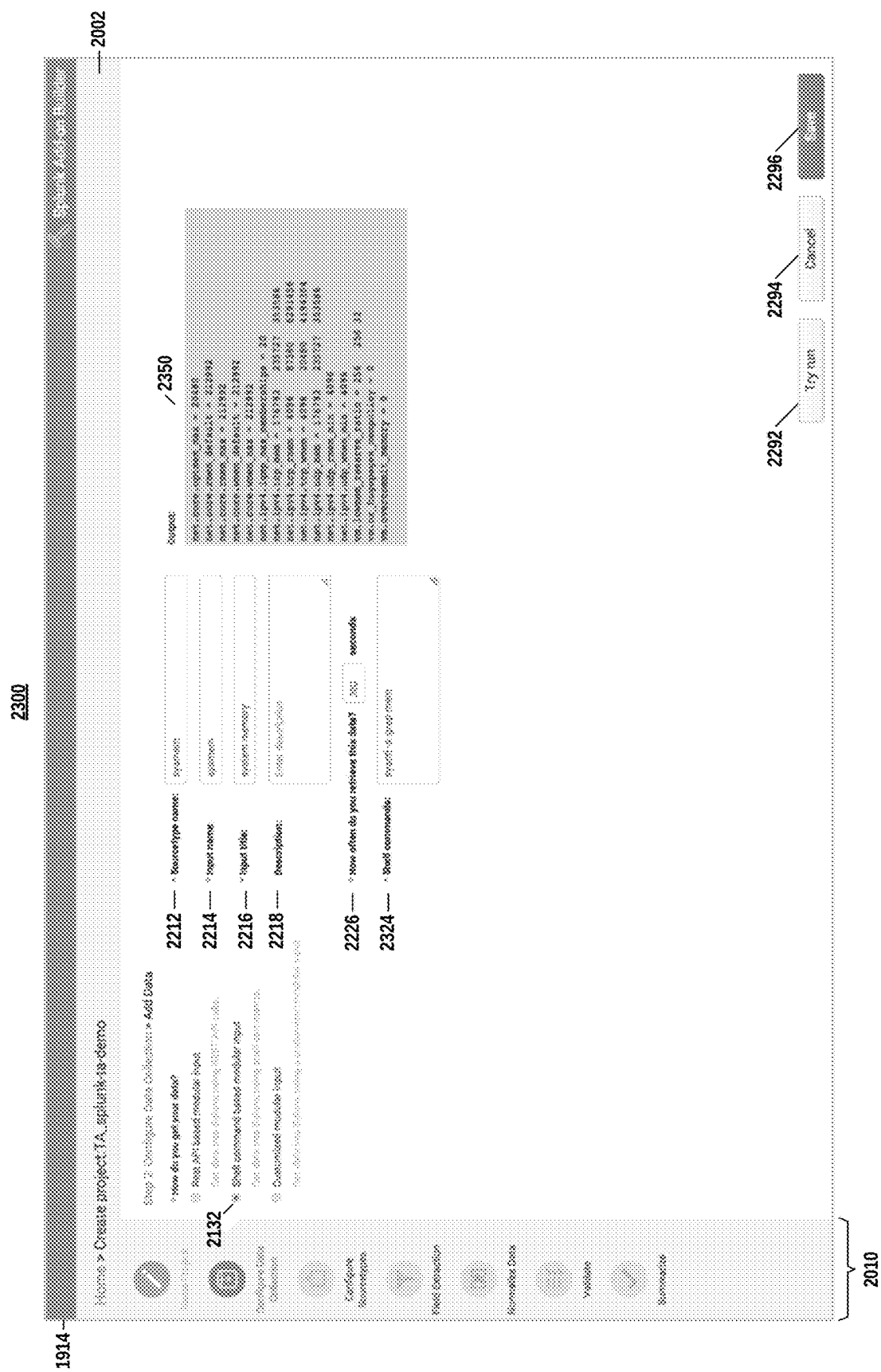
FIG. 23 illustrates a data collection page display of a user control interface embodiment specialized to a second example of a data collection approach in one embodiment.

FIG. 23 illustrates a data collection page display of a user control interface embodiment specialized to a second example of a data collection approach in one embodiment. Interface 2300 illustrates a user interface display as it might appear for an embodiment during the processing of block 1814 of FIG. 18. Interface 2300 of FIG. 23 is an example of an interface display as may result from a user interaction with selection indicator component (radio button) 2132 of interface portion 2100 of FIG. 21 to indicate "Shell command based modular input" as the selected data input option for the current TA. Notably interface portion 2100 of FIG. 21 substantially appears as the upper left portion of interface 2300 of FIG. 23. The remainder of the main body of interface 2300 is specialized in an embodiment in accordance with the user selection of 2132. The main body of interface 2300 is shown to include interface components 2212, 2214, 2216, 2218, 2226, 2292, 2294, and 2296 as already shown and discussed in relation to interface 2200 of FIG. 22. Unlike FIG. 22, components 2212, 2214, and 2216, are now populated with the values "sysmem", "sysmem", and "system memory", respectively. Interface 2300 of FIG. 23 is shown to include shell commands component 2324. Shell commands component 2324 is shown to include a label and an interactive element enabling a user to indicate one or more shell commands to be executed to retrieve the data of the data source represented by the TA. User interaction with the "Try run" action button 2292 in an embodiment may cause the computing machine to execute the shell commands of 2324 with the resulting output appearing in output display area 2350.

Figure 24:
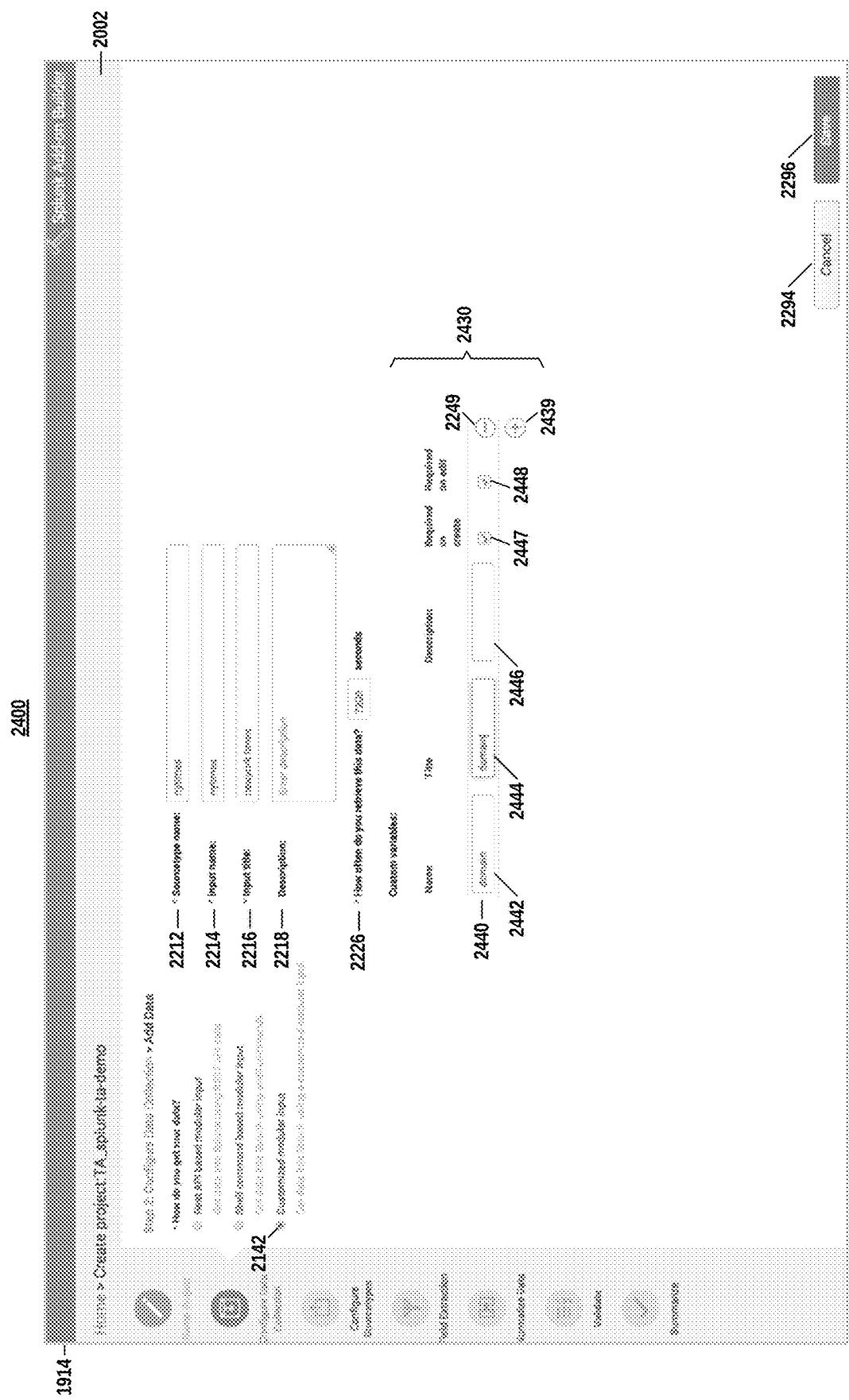
FIGS. 24-25 illustrate data collection page displays of a user control interface embodiment specialized to a third example of a data collection approach in one embodiment.
Figure 25:
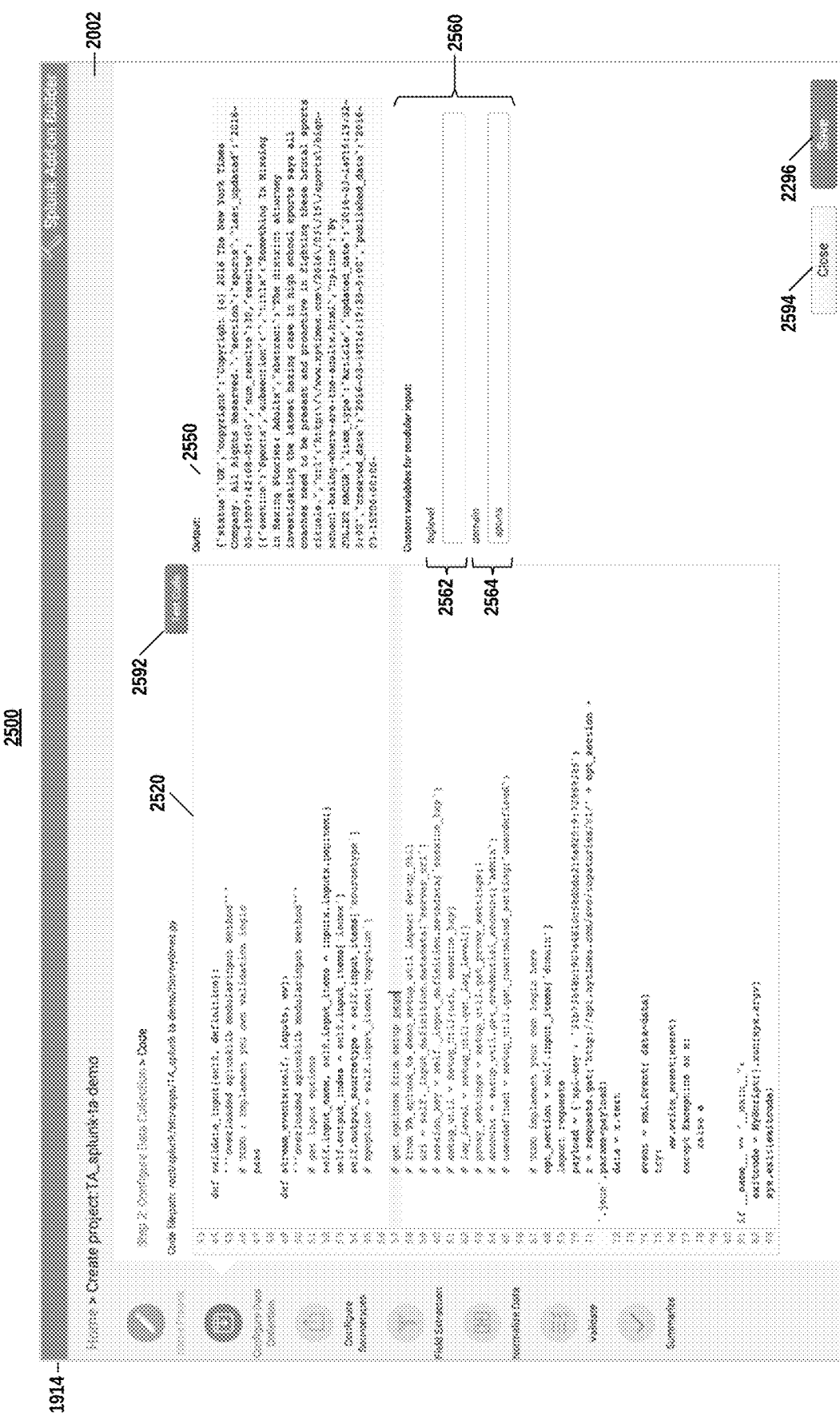

FIGS. 24-25 illustrate data collection page displays of a user control interface embodiment specialized to a third example of a data collection approach in one embodiment.

Interface 2400 of FIG. 24 illustrates a user interface display as it might appear for an embodiment during the processing of block 1814 of FIG. 18. Interface 2400 of FIG. 24 is an example of an interface display as may result from a user interaction with selection indicator component (radio button) 2142 of interface portion 2100 of FIG. 21 to indicate "Customized modular input" as the selected data input option for the current TA. Notably interface portion 2100 of FIG. 21 substantially appears as the upper left portion of interface 2400 of FIG. 24. The remainder of the main body of interface 2400 is specialized in an embodiment in accordance with the user selection of 2142. The main body of interface 2400 is shown to include interface components 2212, 2214, 2216, 2218, 2226, 2294, and 2296 as already shown and discussed in relation to interface 2200 of FIG. 22. Unlike FIG. 22, components 2212, 2214, and 2216, are now populated with the values "nytimes", "nytimes", and "newyork times", respectively. Interface 2400 of FIG. 24 is shown to include custom variable area 2430. A custom variable in one embodiment may describe field information returned by user code that implements the customized modular input. Custom variable area 2430 may include entries for one or more custom variables, such as custom variable entry 2440, and an action button to add a new custom variable entry 2439. Custom variable entry 2440 is shown to include a number of interactive elements. Interface element 2442 enables a user to indicate a name for the custom variable. Interface element 2444 enables a user to indicate a title for the custom variable. Interface element 2446 enables a user to indicate a description for the custom variable. Interface element 2447 enables a user to indicate whether the custom variable is required at creation time. Interface element 2448 enables a user to indicate whether the custom variable is required on edit. Deletion action button 2249 enables a user to indicate a desire to engage processing to empty or delete custom variable entry 2440. In one embodiment, user interaction with "Save" action button 2296 may store configuration and control information appearing on interface 2400 and cause navigation to a related user interface that enables a user to input and test program code for implementing the customized modular input such as now discussed in relation to FIG. 25.

FIG. 25 illustrates a user code page display of a user control interface in one embodiment. Interface 2500 may be a companion interface to a first custom modular input interface, such as 2400 of FIG. 24. Interface 2500 of FIG. 25 includes code window component 2520, custom variables area 2560, output display area 2550, "Test Code" action button 2592, and "Close" action button 2594. Custom variables area 2560 is shown to include multiple custom variable entries 2562, 2564. Each custom variable entry, such as 2562, is shown to include a label made up of the custom variable name and a display area to present values for the custom variable produced during a test execution of the user code. Code window component 2520 in one embodiment enables user interaction to create, view, and edit program code in any supported format to effect the custom modular input. After the entry of the desired program code in code window component 2520 a user may test the program code fine interaction with "Test Code" action button 2592. Results from the test execution may be displayed in output display area 2550 and custom variable area 2560.

In one embodiment, interface 2400 of FIG. 24 and interface 2500 of FIG. 25 are combined into a single interface display page.

Figure 26:
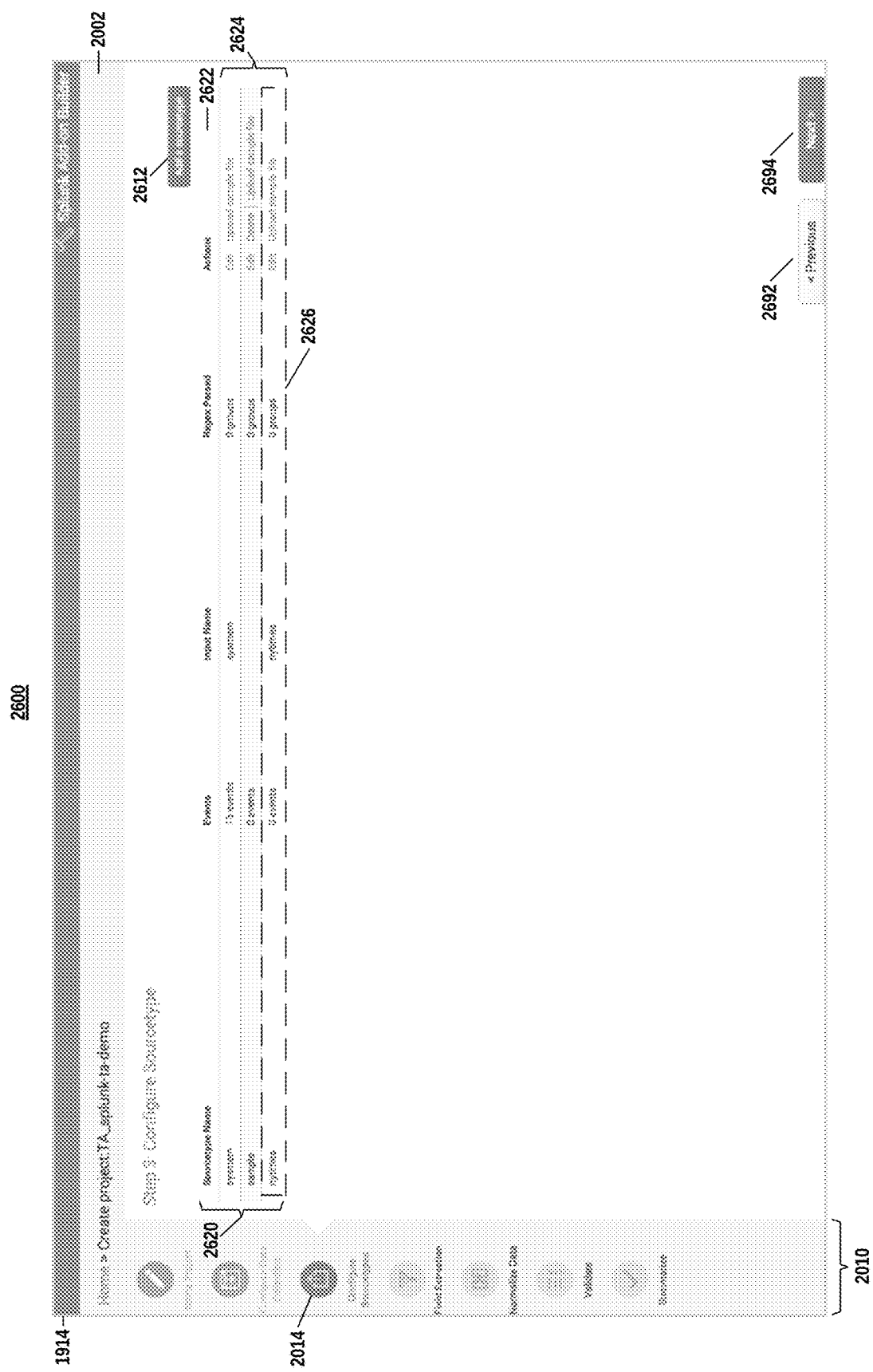
FIG. 26 illustrates a sourcetype page display of a user control interface in one embodiment.

FIG. 26 illustrates a sourcetype page display of a user control interface in one embodiment. Interface 2600 illustrates a user interface display as it might appear for an embodiment during the processing of block 1816 of FIG. 18. In an embodiment, a source type may refer to a particular type of event data structure. In an embodiment, a source type may be associated, directly or indirectly with each event, and source type information may be useful to determine how to format data during and indexing process, for example. Interface 2600 of FIG. 26 is an example of an interface as may be the target of a navigation initiated by means of TA source types section component 2014 of FIG. 20. Interface 2600 of FIG. 26 is shown to include "Add a sourcetype" action button 2612, source type information table component 2620, and action control buttons 2692, 2694. Source type information table component 2620 is shown to include table column header row 2622 and table data area 2624. Table data area 2624 is shown to include multiple source type entries or rows of which source type entry 2626 is an example. An entry appearing in source type information table data area 2624 may be the result of a user earlier having interacted with "Add a source type" action button 2612. In an embodiment, such an interaction may have resulted in the display of a GUI component, such as a pop-up window or the like, enabling the user to provide, select, indicate, or specify configure and control information for a source type. Such information may include a name or identifier for the source type, information regarding delimiter patterns between events in the data, and the like. Source type entry 2626 is shown to include: "nytimes" corresponding to column heading "Source type Name" of table column header row 2622; "0 events" events count corresponding to column heading "Events"; "nytimes" corresponding to column heading "Input Name"; and "0 groups" count corresponding to column heading "Regex Parsed". In an embodiment employing interface 2600, group extraction rules of an extraction model may be constructed of regex expressions or code or an alternative. Source type entry 2626 is also shown to include action options elements "Edit" and "Upload sample file" corresponding to column heading "Actions". Other action options, such as "Delete", are possible in an embodiment, and action options may be interactive to enable the user to indicate a desire to engage processing to perform the indicated action. Careful consideration of the content of source type entry 2626 and certain content of interface 2400 of FIG. 24 will suggest to the skilled artisan that, in an embodiment, the processing of interface 2400 may be a possible source for the information presented in source type entry 2626 of interface 2600 of FIG. 26.

Figure 27:
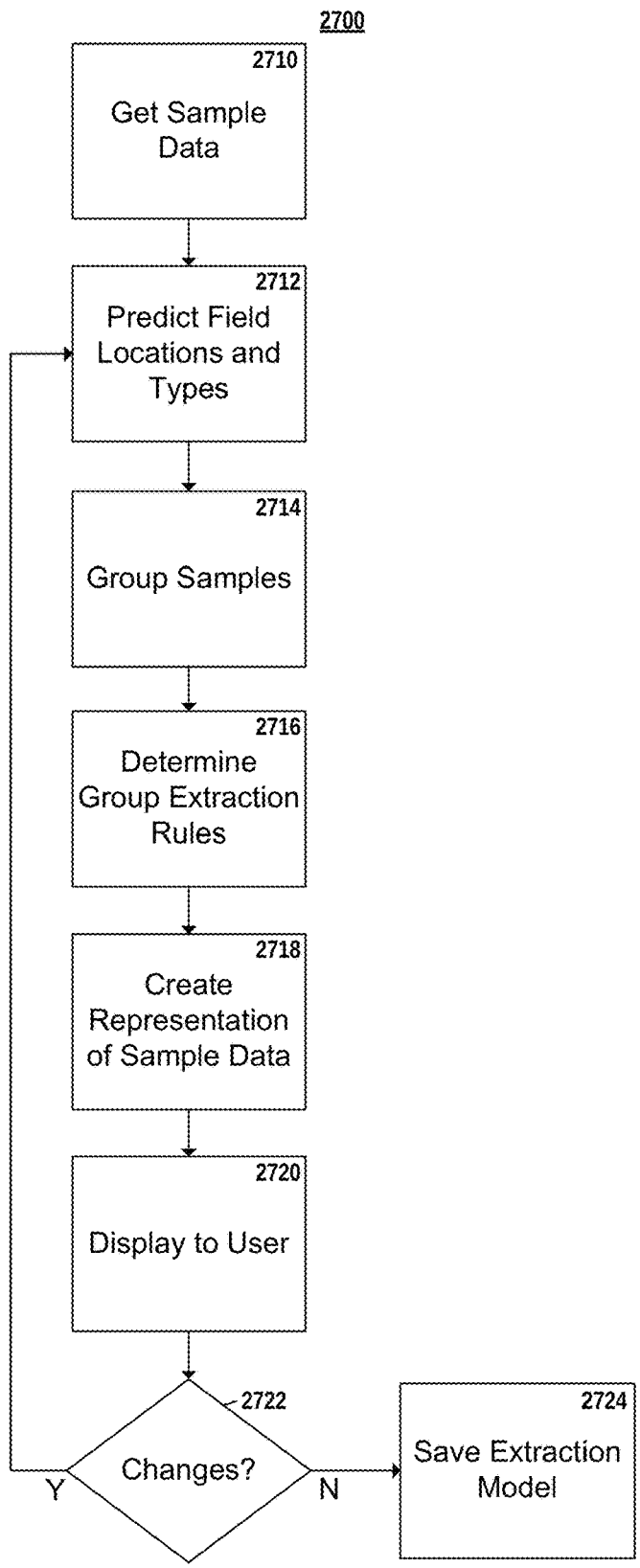
FIG. 27 illustrates a block diagram for a method of a user control interface related to field extraction in one embodiment.

FIG. 27 illustrates a block diagram for a method of a user control interface related to field extraction in one embodiment. Method 2700 is an example of processing as might be associated with the processing of block 1818 of FIG. 18. At block 2710 of FIG. 27, an embodiment may use data source information already known for the TA to go and retrieve sample data. In an embodiment, the sample data made be retrieved directly from the source. In an embodiment the sample data may be retrieved from a file not hosted by the source. In an embodiment, the sample data may be actual data or simulated data. In an embodiment, the sample data may be current, real time, near real-time, or historic. In an embodiment, a system-specified or user-specified maximum may be used to limit the amount of sample data retrieved. In an embodiment, retrieval may amount to accessing or otherwise utilizing sample data already available in the current working context. These and other embodiments are possible.

At block 2712, sample data is evaluated to predict the probable locations of one or more fields in the data of the data source and their data types. An embodiment may also identify a recommended name for each predicted field. In an embodiment, a recommended name may derive from the data itself such as, for example, the key text in a key-value pair. In an embodiment, a recommended name may derive from the type of data itself such as, for example, where the description of the data type followed by a sequential numeric suffix becomes the recommended name, e.g., the 3rd occurrence of a predicted field having the type IP address gets a recommended name of "ipAddr3".

An embodiment may employ one or more techniques, methods, processes, or the like, in order to predict the probable locations of one or more fields in the data of the data source. An embodiment may look for patterns that appear to be key-value pairs within the data. An embodiment may look for patterns representing common data formats such as IP addresses, phone numbers, URLs, and street addresses. An embodiment may look for patterns matching any active field extraction rule known within the DIQ/EPS, for example, within its late-binding or other schema information. An embodiment may limit its searching of known patterns based on the association of patterns with a specific subject matter domain associated with the data source. In such an embodiment, the subject matter domain may be associated with the data source by prior user input, metadata about the data source, or by an evaluation of the sample data possibly employing heuristics, machine learning, AI, and similar techniques. These and other embodiments are possible.

At the same time or separately, an embodiment may identify patterns that suggest breakpoints in the data, such as boundaries between data reflecting distinct events. The breakpoints and field predictions may be applied to the sample data in an embodiment to provide a parsed events view of the sample data. These parsed event samples may be grouped at the processing of block 2714. Categorizing the parsed event samples into groups at block 2714 may be performed in an embodiment based on a measure of similarity. In an embodiment, such categorizing may involve cluster analysis, similarity scoring, difference scoring, or the like. For each group identified at block 2714, the computing machine may determine an extraction rule that successfully extracts all of the predicted field data from all of the samples in the group. In an embodiment, such determination may include examination of the location, size, content, or other aspects of predicted field data and non-field data within the sample data of the group. If the computing machine is unable to determine a successful extraction rule the sample data of the group may be regrouped or the entirety of the sample data may be regrouped in an embodiment. At the termination of the processing associated with block 2716 of method 2700 in one embodiment, a set, collection, list, group, or the like, of extraction rules, including computer-generated extraction rules, has been identified. In an embodiment, each extraction rule of the set may correspond to a respective sample data group. In an embodiment, extraction rules and sample data groups are not limited to a 1-to-1 relationship. In an embodiment, the set of extraction rules that successfully address all of the sample data is considered to be an extraction model. In another embodiment, a set of extraction rules that successfully address a substantial proportion of the sample data is considered to be an extraction model. In another embodiment, a set of extraction rules that successfully address all of the predicted fields in the sample data that are associated with a particular subject matter domain are considered to be an extraction model. In another embodiment, a single extraction rule that successfully addresses all of the field data in the largest proportion of the sample data is considered to be an extraction model. These and other embodiments are possible.

At block 2718, a representation of some or all of the sample data rendered in light of the data extraction model is created by the computing machine. In one embodiment, the original text of the sample data is augmented by highlighting segments of the sample data predicted to be fields, where each field is associated with a particular color of highlighting. In one embodiment the original text of the sample data is modified by replacing segments of the sample data predicted to be fields with an identifier for the field, such as a recommended name. In one embodiment, the original text of sample data is modified by replacing segments of the sample data that does not contain predicted field data with a null or fixed value text string. These and other embodiments are possible.

At block 2720, some or all of a representation created by the processing of block 2718 is displayed to the user via an interactive interface. In an embodiment, the interactive display may include a representation of some or all of the sample data as well as a representation of one or more of the associated extraction rules of the extraction model. In an embodiment, a user may indicate confirmation, acceptance, endorsement, or the like, of the extraction model or indicate changes such as by indicating a missed field extraction, and improper field extraction, a failed group identification, or the like. At block 2722, an embodiment may determine whether user interaction with the interface indicates changes to the extraction model. If so, processing may return to an earlier block, such as 2712, and all or a portion of the processing to generate an extraction model may be repeated in light of the user provided input. If not processing may proceed to block 2724 where the extraction model is saved. In an embodiment, an extraction model may be saved as part of configuration and control data store 1830 of FIG. 18.

In an embodiment, the processing envisaged by blocks 2710 through 2718 of method 2700 occurs within an acceptable response time period in a live interactive user session. In one embodiment, an acceptable response time is maintained where the majority of responses are about 400 ms or less. In one embodiment, an acceptable response time is maintained where the majority of response times are about 1 second or less; in another, about 2 seconds or less; in another, about 5 seconds or less; in another, about 10 seconds or less; and in another, about 20 seconds or less. In an embodiment directed to a large sample data size of highly variable data patterns, an acceptable response time may be maintained where the majority of response times are about 1 minute or less. In an embodiment, response time may be meaningfully measured from the receipt by a computing machine of a user input that is the proximate cause, or an anticipated user input that was the proximate cause of shown processing of method 2700 starting at block 2710, up to the point in time where a responsive display begins to be presented to the user, such as the display of block 2720. In an embodiment, response time may be meaningfully measured from the shown beginning of the processing of block 2712 up to the point in time where responsive display begins to be presented to the user. In an embodiment, the beginning and completion of presenting a responsive display to the user may be virtually simultaneous. In an embodiment, the responsive display may be presented progressively as data becomes available.

Figure 28:
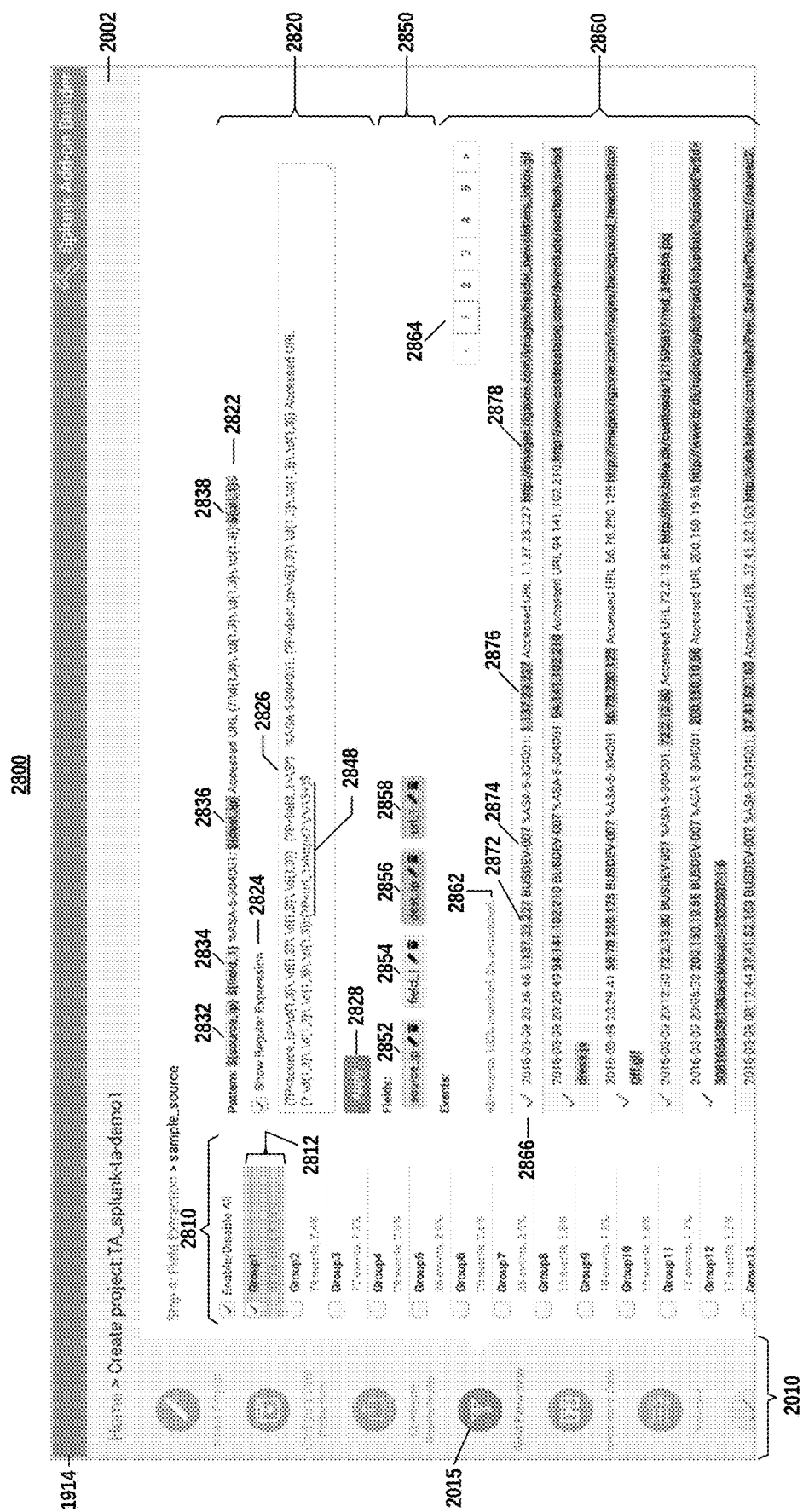
FIG. 28 illustrates a field extraction page display of a user control interface in one embodiment.

FIG. 28 illustrates a field extraction page display of a user control interface in one embodiment. Interface 2800 illustrates a user interface display as it might appear for an embodiment during the processing of block 1818 of FIG. 18. Interface 2800 of FIG. 28 is an example of an interface as may be the target of a navigation initiated by means of TA field extraction section component 2015 of FIG. 20 or action button component 2694 of FIG. 26. Interface 2800 of FIG. 28 is shown to include extraction group list area 2810, extraction pattern area 2820, extraction fields area 2850, and events area 2860. Extraction group list area 2810 is shown to include an entry, tile, area, component, or the like for each of a number of extraction groups such as may be identified during the processing associated with block 2714 of FIG. 27. An entry in extraction group list area 2810 of FIG. 28, such as group list entry 2812, may include a group name or identifier (e.g., "Group1"), and an indication of the number of events of sample data classified in the group (e.g., "435 events"), an indication of the proportion of total sample data events classified in the group (e.g., "43.5%"), and a select-for-action check box (e.g., "☑"). Group list entry 2812 is shown to have a pronounced appearance indicating it is a selected group, in one embodiment.

Extraction pattern area 2820 is shown to include pattern display component 2822, recognition pattern expression display selection component 2824, pattern expression display area 2826, and "Apply" action button 2828. Pattern display component 2822 is shown to include a label ("Pattern:") and a representation of sample data rendered, produced, derived, generated, or created in consideration of, in accordance with, in light of, in respect to, and/or in view of an extraction rule, such as a group extraction rule of an extraction model as may be generated by the processing of block 2716 of FIG. 27. The representation of sample data for one event shown for 2822 of FIG. 28 displays its non-field data, i.e., data not subject to the field extraction by application of the extraction rule, in original form as unadorned text. Each segment of sample data of the event identified as field data by application of the extraction rule is substituted in the representation of 2822 with a color-coded token that includes the extracted field name. Green field token 2832 appears in place of the original source sample event text that corresponds to a source_ip field. Yellow field token 2834 appears in place of the original source sample event text that corresponds to a field_1 field. Pink field token 2836 appears in place of the original source sample event text that corresponds to a dest_ip field. Blue field token 2838 appears in place of the original source sample event text that corresponds to a url_1 field. Recognition pattern expression display selection component 2824 permits user interaction to select or deselect the display of the recognition pattern expression (i.e., group extraction rule of an extraction model) applied to the data of a sample event to produce the representation shown at 2822. Display selection component 2824 is shown with a check mark in a check box indicating selection of the option to display the recognition pattern expression, possibly by default value or possibly as the result of user interaction, in an embodiment. The recognition pattern expression (i.e., group extraction rule of an extraction model) applied to the data of a sample event to produce the representation shown at 2022 is shown as content of pattern expression display area 2826. Consideration of extraction rule content appearing in 2826 reveals a correspondence between extraction rule field portions and the tokens of 2822, e.g., expression text 2848 corresponding to token 2838. Pattern expression display area 2826 may be interactive so as to enable a user to edit the extraction rule. After editing the extraction rule of display area 2826, a user in one embodiment may interact with Apply action button 2828 to indicate a desire to engage processing that applies the edited rule to sample data and updates the content of interface 2800 accordingly.

Extraction fields area 2850 is shown to include a list, group, set, collection, or the like, of tokens, tiles, representations, or the like, each corresponding to a field recognized by an extraction rule (such as appears in 2826) for a group (such as 2812) of an extraction model. Four token interface components are shown 2852, 2854, 2856, and 2858, with each token displaying a field name, an editing action icon (pencil), and a deletion action icon (trashcan). Token 2852 is shown for a source_ip field and corresponds to, and is similarly colored as, field token 2832. Token 2854 is shown for a field_1 field and corresponds to, and is similarly colored as, field token 2834. Token 2856 is shown for a dest_ip field and corresponds to, and is similarly colored as, field token 2836. Token 2858 is shown for a url_1 field and corresponds to, and is similarly colored as, field token 2838. The displayed set of tokens 2852, 2854, 2856, and 2858 may be considered in an embodiment as one possible representation of source sample event data after application of a group extraction rule, i.e., a fields-only representation produced by omitting non-field text of the original event data and substituting an interactive color-coded token for each segment of field text of the original event data.

Events area 2860 is shown to include summary information display component 2862, events area data page navigation component 2864, and the detail information display component showing multiple event detail entries, such as event detail entry 2866. An event detail entry such as 2866 may correspond to data for an event from data source sample data and may include a representation of that data rendered in view of a group extraction rule such as shown in 2826. The example rendering or representation of sample data for one event detail entry shown for 2866 displays its non-field data, i.e., data not subject to the field extraction by application of the extraction rule, in original form as unadorned text. Each segment of sample data of the event that is identified as field data by application of the extraction rule retains its original text, and the original text is highlighted, color-coded, or otherwise visibly distinguished. For example, original text "1.137.23.227" may be identified by the extraction rule as corresponding to a source_ip field and is highlighted with green coloring; original text "BUSDEV-007" may be identified by the extraction rule as corresponding to a field_1 field and is highlighted with yellow coloring; original text "1.137.23.227" may be identified by the extraction rule as corresponding to a dest_ip field and is highlighted with pink coloring; and original text beginning with "http" and ending with "header_newsletter.inbox.gif" may be identified by the extraction rule as corresponding to a url_1 field and is highlighted with blue coloring.

Summary information display component 2862 may display summary information regarding the application of one or more group extraction rules to a set of sample data for a data source. Summary component 2862 may display, for example, the total number of events processed from the sample data (e.g. "435 events"), the proportion of total events from which all Fields represented in the extraction rule were successfully fully matched for extraction (e.g., "100% matched"), and the remaining proportion of total events where matches for all Fields were not found ("e.g., "0% unmatched"). Other embodiments may display different combinations of the same or different summary information.

Events area data page navigation component 2864 is interactive to enable a user to navigate through the display of representations of a number of events, where the number of events may be greater than can be presented in events area 2860 at one time.

Figure 29:
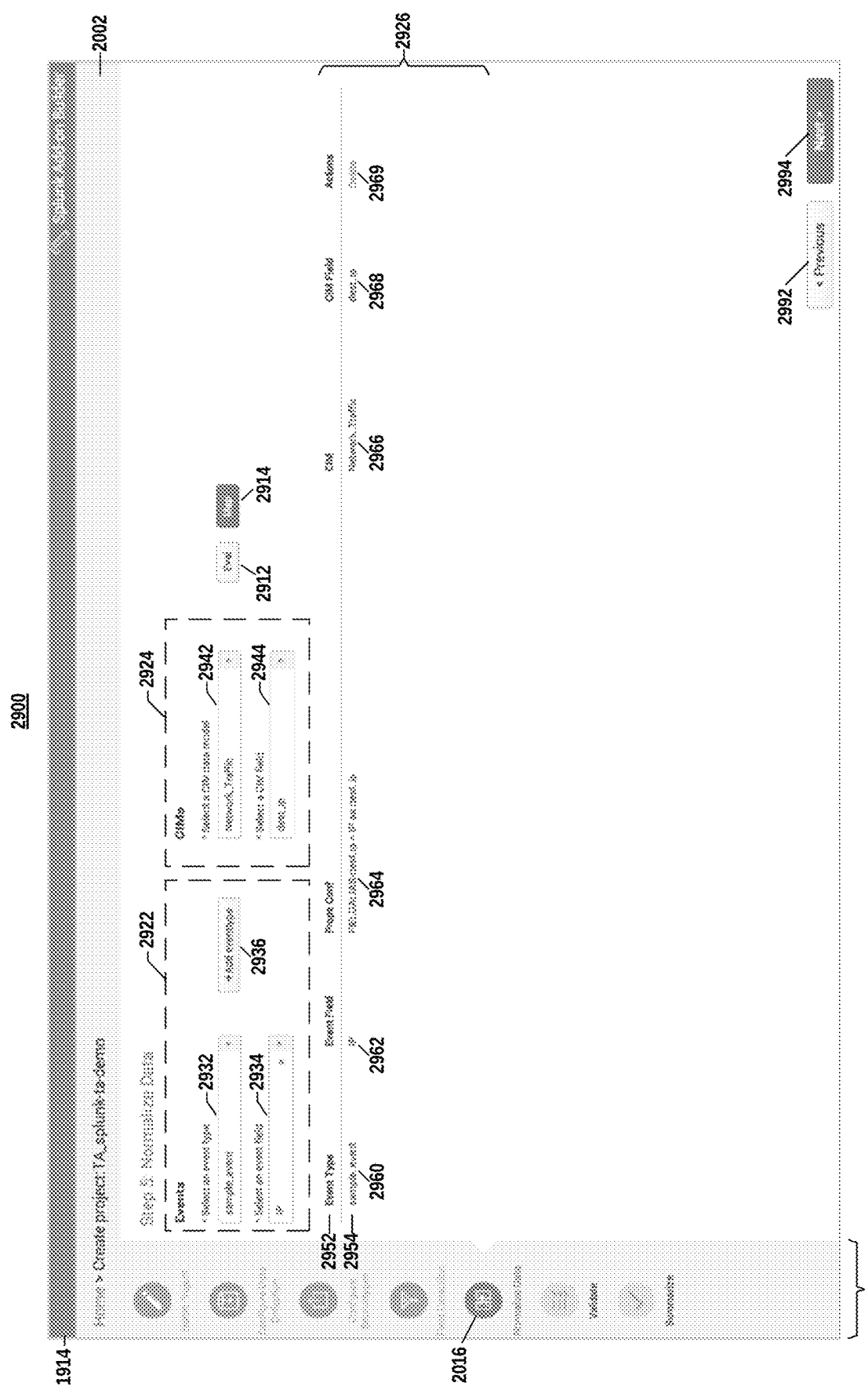
FIG. 29 illustrates a data normalization page display of a user control interface in one embodiment.

FIG. 29 illustrates a data normalization page display of a user control interface in one embodiment. Interface 2900 illustrates a user interface display as it might appear for an embodiment during the processing of block 1820 of FIG. 18. Interface 2900 of FIG. 29 is an example of an interface as may be the target of a navigation initiated by means of TA normalize data section component 2016 of FIG. 20. Interface 2900 of FIG. 29 is shown to include event data area 2922, normalized data area 2924, data normalization mappings detail area 2926, Eval action button 2912, Map action button 2914, Previous action button 2992, and Next action button 2994. Event data area 2922 may display interface components related to identifying a field of event data that is to be mapped for normalization. Event data area 2922 is shown to include event-type component 2932, event-field component 2934, and "Add eventtype" action button 2936. Event-type component 2932 may be interactive and may include, for example, a drop-down selection box enabling the user to indicate the selection of an event-type having a field to be mapped for data normalization. In an embodiment, an event type (eventtype) may be a category for events united by the fact that a same search string can match all of the events desired in the category. Event-field component 2934 may be interactive and may include, for example, a drop-down selection box enabling the user to indicate the selection of a field that may be present in data having the event type designated at 2932. In an embodiment, data values appearing for interface components 2932 and 2934 may be default values or may be values determined as the result of an earlier user interaction, in an embodiment. When a selection list of event-type component 2932 does not include an event-type desired by the user, a user may interact with "Add eventtype" action button 2936 to engage processing that enables a user to add an event type. Such processing may include, for example, updating the display of interface 2900 to include a pop-up window or other user interface component prompting the user for indications of the types of information necessary to specify a new or additional event type.

Normalized data area 2924 may display interface components related to identifying normalized identifiers, attributes, characteristics, formats, scales, and the like as may be associated with a field or field values, and is shown to include data model component 2942 and data model field component 2944.

Normalized data area 2924 may be interactive and may include, for example, a drop-down selection box 2942 enabling the user to indicate the selection of a data model having normalization data related to one or more fields in the model. The model may be part of a common information model (CIM) and/or common information model management facility of a DIQ system. Data model component 2944 may be interactive and may include, for example, a drop-down selection box enabling the user to indicate the selection of field associated with a data model designated at 2942. Values appearing for interface components 2942 and 2944 may be default values or may be values determined as the result of an earlier user interaction, in an embodiment.

In an embodiment, after event data area 2922 is properly populated with information to identify an event field to normalize, and after normalized data area 2924 is properly populated with information to identify a target normalization, a user may interact with action button 2912 to engage processing that evaluates the acceptability of the normalization indicated by reference to the contents of 2922 and 2924. An indicated normalization may be unacceptable, for example, where there is an attempt to map a text event field to a numeric field of the normal model. In an embodiment, successful evaluation as determined by processing initiated by user interaction with action button 2912 may be indicated back to the user by activating or enabling action button 2914. Map action button 2914 may be interactive so as to enable a user to engage processing to store the normalization mapping indicated by contents of 2922 and 2924 as part of the configuration in control information for a TA. In an embodiment, such processing may also result in updating interface 2900 to include a data normalization mapping detail entry, such as 2954, for the new normalization mapping in data normalization mappings detail area 2926.

Data normalization mappings detail area 2926 may display detailed information for one or more data normalization mappings included in the configuration and control data of a TA, and is shown to include column header row 2952 and a data normalization mapping detail entry 2954. Mapping detail entry 2954 is shown to include "sample event" value 2960 corresponding to column heading "Event Type"; "IP" value 2962 corresponding to column heading "Event Field"; "FIELDALIAS-dest_ip=IP as dest_ip" value 2964 corresponding to column heading "Props Conf" (referring to a specific category of control information for a DIQ in one embodiment that may direct a normalization mapping operation of the DIQ); "Network.Traffic" value 2966 corresponding to column heading "CIM"; and "dest_ip" value 2968 corresponding to column heading "CIM Field". Consideration of the illustrative content shown for interface 2900 reveals to the skilled artisan a correspondence between information of 2922 and 2924 used to establish/create/define a data normalization mapping for a field and the information of a detail entry such as 2954. In an embodiment, once a user completes the specification for all field normalization mappings desired for a particular TA a user may, for example, interact with an interface component such as Next action button 2994 to commit the normalization mappings to storage as configuration and control data of the TA, and possibly navigate to a different user interface display.

Figure 30:
FIG. 30 illustrates a validation page display of a user control interface in one embodiment.

FIG. 30 illustrates a validation page display of a user control interface in one embodiment. Interface 3000 illustrates a user interface display as it might appear for an embodiment during the processing of block 1822 of FIG. 18. Interface 3000 of FIG. 30 is an example of an interface as may be the target of a navigation initiated by means of TA validate section component 2017 of FIG. 20 or action button component 2994 of FIG. 29. Interface 3000 of FIG. 30 is shown to include validation process monitoring and control section 3012, validation results overview section 3014, graphical validation results display area 3016, results detail display area 3018, and interactive action buttons 3092, 3094.

In an embodiment, validation for the control and configuration data of a TA, and possibly more generally, may be performed by evaluating computer data representing a validation target, such as a TA, against a set of validation rules. In an embodiment, the computer-readable validation rules may be represented in a computer programming language. In an embodiment, the computer-readable validation rules may be represented as control parameters for a validation engine. In an embodiment, the computer-readable validation rules may include regex expressions. These and other embodiments are possible.

In an embodiment, the computing machine may operate on organizational groupings of validation rules. For example, validation rules may be logically and/or physically organized into groups, sets, subsets, lists, collections, categories, or the like. In an embodiment, such categories of validation rules may be based on subject matter or domain, rule source, rule aspect, rule content type, validation target type, or the like. In an embodiment, groups of validation rules may be related on a peer basis, a hierarchical basis, linear basis, a network basis, or the like. An embodiment may expose user interfaces, possibly GUIs, to enable a user to create, view, update, and delete validation rule groups and their interrelationships. A DIQ system that implements a control interface for the management of grouped validation rules may enable the surfacing of such validation rule groupings at other control interface points, such as interface 3000.

Validation process monitoring and control section 3012 may include an active validation rule display area 3022, a Validate action button 3024, and a validation process status indicator 3026. Active validation rule display area 3022 may display a representation of the validation rules that will be used to perform a validation process. In an embodiment, validation rules may be represented in 3022 by validation rule category components, such as 3032, 3034, 3036, and 3038, that each represent a group of one or more validation rules. Validation rule category component 3032 may represent a group of rules identified as a "Best Practice" category of rules. Validation rule category component 3034 may represent a group of rules identified as a "CIM Mapping" category of rules. Validation rule category component 3036 may represent a group of rules identified as a "Field Extract" category of rules. Validation rule category component 3038 may represent a group of rules identified as a "Modular Input" category of rules. In an embodiment, a validation rule category component, such as 3032, may be interactive so as to enable a user to invoke processing for an action related to the rule category represented by the component, such as a deletion action. Moreover, the validation rule display area 3022 may itself be interactive in an embodiment to enable a user to drag-and-drop validation rules, drag-and-drop validation rule group or category tokens, directly enter a rule category name, directly enter a validation rule, or the like. In an embodiment, after a user has ascertained that the desired set of validation rules for a validation process have been identified and/or activated as may be indicated by their representation in display area 3022, the user may interact with Validate action button 3024 to indicate a desire to engage validation processing against the current TA using the identified and/or activated validation rules. In an embodiment, processing engaged or invoked in response to user interaction with Validate action button 3024 may perform validation of the TA using the selected, identified, or activated validation rules while updating the appearance of status indicator 3026 of interface 3000 to report its progress. Results of such a validation process may be reported for an embodiment in sections of interface display 3000 next discussed.

Validation results overview section 3014 may be included in an embodiment to provide a high level overview or summary of a validation process run against the TA. Validation results overview section 3014 is shown to include health score 3042, total error count 3044, and total warnings count 3046. Graphical validation results display area 3016 may be included in an embodiment to provide one or more graphical visualizations of validation results. The illustrative contents of display area 3016 are shown to include bar chart 3050 which visualizes validation results by validation rule category and severity level, and pie chart 3060 which visualizes validation results by severity level. An embodiment may employ these and other numbers, styles, and combinations of visualizations to depict validation results. Aspects of a visualization in display area 3016 may be interactive in an embodiment. For example, each wedge of pie chart 3060 may be enabled for user interaction such that a mouse click of the wedge establishes a category for data represented by the wedge as a filter criteria for the display of validation result details as may appear in display area 3018.

Results detail display area 3018 may be included in an embodiment to provide detailed information concerning all or selected validation process results. In an embodiment, for example, detail display area 3018 may provide detailed information concerning only validation rules that failed with an indicated severity level of warning, critical, or higher. Results detail display area 3018 is shown to include column header bar 3072 and multiple individual result entries, such as 3074. The detail information for a particular result may include for example, the name of the add-on (TA) being validated, the name of the validation rule responsible for the result, the severity level of the result, the rule category to which the rule belongs, a description of the detected validation condition, and a suggested solution to eliminate the condition. A user unhappy with the validation results may navigate among user interfaces provided to create, modify, and maintain the configuration control data of a TA, possibly by interacting with TA control section navigation panel 2010, and eventually returning to interface 3000 to produce a validation result that is more acceptable. A user that finds the validation results reported on interface 3000 to be acceptable may interact with action button 3094 to indicate confirmation, acceptance, approval, completeness, or the like of the configuration and control data of the TA, and to thereby invoke processing to store an approved version of the TA in an embodiment, perhaps storing it among the data of configuration and control data 1830 of FIG. 18. Processing engaged by user interaction with action button 3094 of interface 3000 of FIG. 30 may further cause navigation to a different or subsequent interface display.

Figure 31:
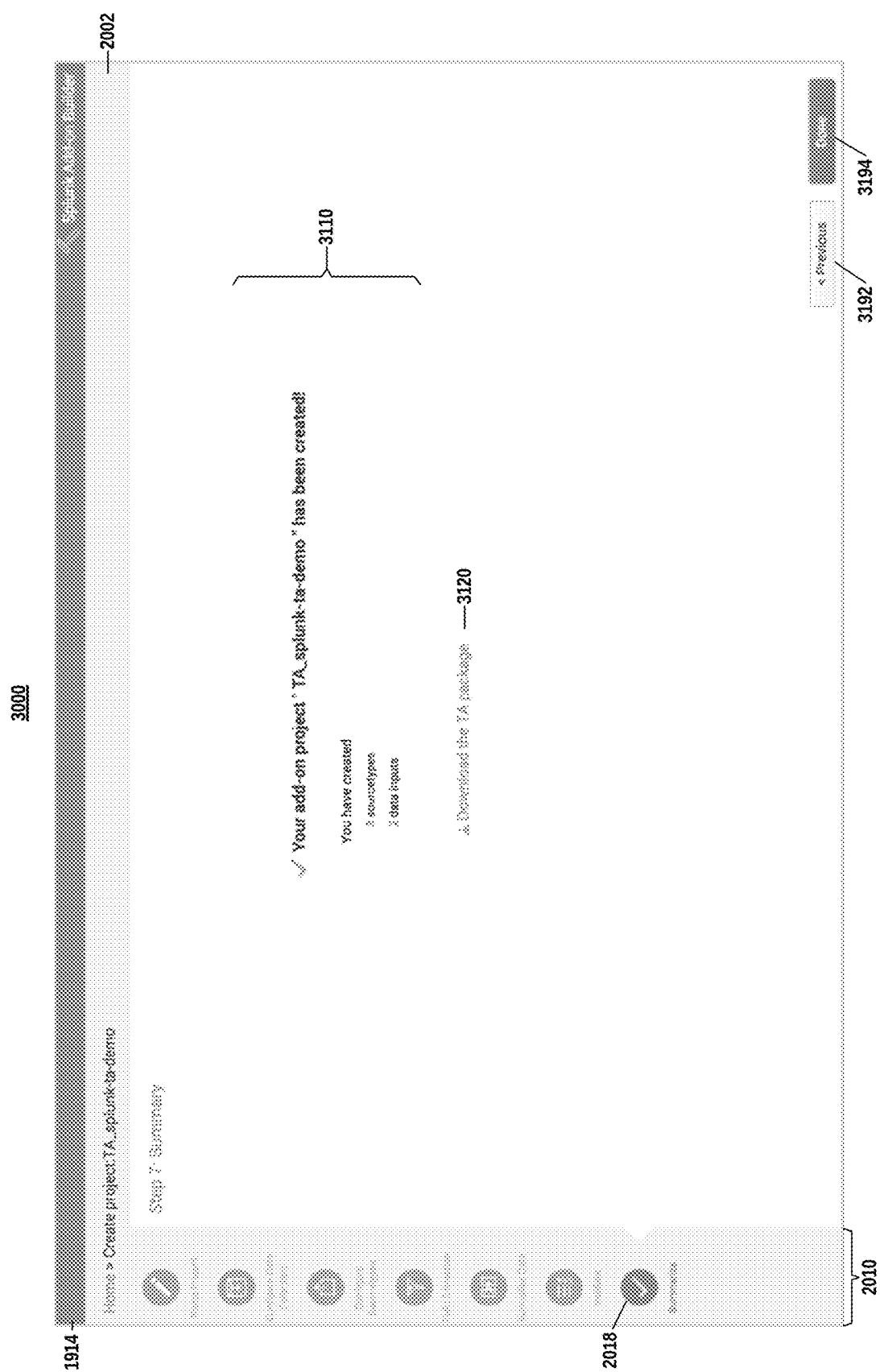
FIG. 31 illustrates a summary page display of a user control interface in one embodiment.

FIG. 31 illustrates a summary page display of a user control interface in one embodiment. Interface 3100 illustrates a user interface display as it might appear for an embodiment during the processing of block 1824 of FIG. 18. Interface 3100 of FIG. 31 is an example of an interface as may be the target of a navigation initiated by means of TA summarize section component 2018 of FIG. 20 or action button component 3094 of FIG. 30. Interface 3100 of FIG. 31 is shown to include summary display area 3110, download action component 3120, and action buttons 3192 and 3194. In an embodiment, summary display area 3110 may include a confirmation message that a technology add-on (TA) has been successfully created and stored. In an embodiment, summary display area 3110 may include summary information or statistics about the TA, for example, the number of associated source types, the number of data inputs, and the like. In an embodiment, download action component 3120 may be interactive to enable a user to engage processing to effect the download of control and configuration data of the subject TA. Such processing may include the update of the display of interface 3000 by a sequence of one or more pop-up windows, for example, enabling a user to specify information to control the download operation. Such information may include a formatting, representation, or packaging for the downloaded or exported TA, and a target storage location, for example.

One of skill appreciates from the foregoing inventive aspects of a novel and robust control interface as may be employed for a data input and query system (DIQ). The control interface provides a user such as an administrator with access to configuration and control data that determines the operation of the DIQ computing machine. A variety of embodiments were illustrated, and even more discussed, to illustrate and teach inventive aspects. Details of these embodiments have been disclosed to provide a context for explaining inventive aspects but one of skill will understand that the inventive aspects are not limited to the specific details disclosed and alternative embodiments and implementations abound, even were not expressly recited, without departing from the inventive teachings. This point may be elaborated with a few examples. User interface display images, for example, may at points herein be referred to as "pages" or "page displays." Use of such terminology, however, should not be construed as constraining inventive subject matter to page-based user interface mechanisms, such as a web page browser, nor to other implementation details that unnecessarily draw on the "page" metaphor. For example, while one may consider a page to have all its information viewable at once, a page of a user interface may not be so constrained, particularly in a digital computing environment where a display page may be scrollable within a viewing window, may have portions that are themselves scrollable, may be built or populated progressively, may include dynamic elements, and the like. Similarly, while one may consider a page as having all its contents at one place at one time, a page of a user interface may not be so constrained, and content described herein for a display page may be distributed across multiple "pages" or multiple "pages" may be combined to a single page without departing from inventive subject matter.

Similarly, many details have been discussed in disclosed in regards to user interfaces including graphical user interfaces (GUIs). While it is convenient to describe inventive subject matter in terms of embodiments that include familiar technologies, components, and elements, the inventive subject matter should not be considered to be constrained to these and the ready availability and appropriateness of substitutes, alternatives, extensions, and the like is to be recognized. What may be shown or described as a single GUI or interface component should liberally be understood to embrace combinations, groupings, collections, substitutions, and subdivisions in an embodiment. What may be shown or described as a single GUI or interface component may indeed be embodied as an atomic or elemental interface component or may readily be embodied as a complex or compound component having multiple constituent parts. What may be shown, described, or suggested to be a uniformly shaped in contiguous GUI your interface component, such as an interface region, area, space, or the like, may be readily subject to implementation with non-uniformly shaped or noncontiguous display real estate.

As yet one more example, apparatus that perform methods, processes, procedures, operations, or the like, disclosed herein may be referred to as a computer, computer system, computing machine, or the like. Any such terminology used herein should be reasonably understood as embracing any collection of temporarily or permanently connected hardware devices in combination with any software each requires to operate and perform operations and functions necessary to an implementation of an inventive aspect. Adopting such an understanding is consistent with modern computing practices and eliminates the need to obscure the disclosure of inventive aspects with catalogs of implementation options and alternatives.

As one final example, methods, procedures, or processes may be described herein by reference to flow charts or block diagrams and possibly in terms of sequences of steps or operations. It should be understood, however, that the practice of an inventive aspect is generally not limited to the number, ordering, or combination of operations as may be described for an illustrative embodiment used to teach and convey an understanding of inventive aspects possibly within a broader context. Accordingly, not all operations or steps described are illustrated may be required to practice of an inventive aspect. Different embodiments may variously omit, augment, combine, separate, reorder, or reorganize the performance of operations, steps, methods, procedures, functions, and the like disclosed or suggested herein without departing from an inventive aspect. Further, where sequences of operations may be illustrated, suggested, expressed, or implied, an embodiment practicing inventive aspects may perform one or more of those operations or sets of operations in parallel rather than sequentially.

Accordingly, inventive aspects disclosed herein should be considered broadly without unnecessary limitation by the detailed disclosure, and should be considered as limited only by accompanying claims.

What is claimed:

1. A method comprising:
    causing a presentation of a user interface enabling a user to indicate an identifier for a technology extension for a data input and query system (DIQS) and to indicate access information for a data source external to the DIQS and associated with the technology extension;
    receiving user input indicating the identifier and the access information;
    accessing sample data of the data source based at least in part on the access information, the sample data comprising a plurality of machine-generated events;
    automatically determining content, based at least in part on the sample data, of a machine-generated extraction model for identifying field information in data of the data source, wherein automatically determining content of the machine-generated extraction model comprises:
        performing pattern recognition within the sample data to predict breakpoints between the plurality of machine-generated events,
        dividing the sample data into the plurality of machine-generated events based on the breakpoints between the plurality of machine-generated events,
        generating a plurality of field predictions of the plurality of machine-generated events,
        clustering the plurality of machine-generated events into a first plurality of extraction groups comprising a first group, wherein the first group comprises a portion of the plurality of machine-generated events,
        automatically determining a first extraction rule that extracts field data from the first group based on the plurality of field predictions,
        determining that the first extraction rule fails to satisfy a criterion based on a proportion of the field data successfully extracted,
        re-clustering the plurality of machine-generated events into a second plurality of extraction groups responsive to the first extraction rule failing to satisfy the criterion,
        automatically determining a second extraction rule that extracts field data from a second group of the second plurality of extraction groups based on the plurality of field predictions,
        determining that the second extraction rule satisfies the criterion, and
        adding the second extraction rule to the machine-generated extraction model based on the second extraction rule satisfying the criterion;
    causing the presentation of the user interface including a representation based at least in part on the machine-generated extraction model and enabling the user to indicate an acceptance of the machine-generated extraction model; and
    upon user acceptance of the machine-generated extraction model,
        causing the presentation of the user interface including a plurality of validation rule categories that each represent a group of one or more validation rules, and
        configuring, responsive to a user interaction with the user interface, a validation rule category and at least one validation rule within at least one of the plurality of validation rule categories to obtain a configuration, wherein the validation rule category is in the plurality of validation rule categories;
    activating a validation process and presenting a validation result based on the configuration; and
    upon user approval of the validation result, storing the machine-generated extraction model in association with the identifier,
    wherein the method is performed by a computer system comprising one or more processors.

2. The method of claim 1, wherein the accessing and determining is performed automatically after receiving the user input indicating the access information.

3. The method of claim 1, wherein the access information relates to a representational state transfer application programming interface (REST API).

4. The method of claim 1, wherein the access information relates to a GET and/or a POST request for a representational state transfer application programming interface (REST API).

5. The method of claim 1, wherein the access information includes user-coded programming related to exercising a representational state transfer application programming interface (REST API).

6. The method of claim 1, wherein the machine-generated extraction model includes the second plurality of extraction groups based at least in part on a cluster analysis of a representation of the sample data and wherein each extraction group is associated with an extraction pattern.

7. The method of claim 1, wherein the machine-generated extraction model includes the second plurality of extraction groups based at least in part on a cluster analysis of a representation of the sample data and wherein each extraction group is associated with an extraction pattern represented as a regex expression.

8. The method of claim 1, wherein storing the machine-generated extraction model in association with the indicated identifier includes storing the machine-generated extraction model and the indicated identifier in a representation format for an extension of the DIQS.

9. The method of claim 1, wherein storing the machine-generated extraction model in association with the indicated identifier includes storing the machine-generated extraction model and the indicated identifier in a distributable representation format for an extension of the DIQS.

10. The method of claim 1, wherein the representation based at least in part on the machine-generated extraction model includes a segment of the sample data with machine-generated field names substituted for data within the segment.

11. The method of claim 1, wherein the representation based at least in part on the machine-generated extraction model includes a segment of the sample data with machine-generated field names substituted for data within the segment, and wherein the machine-generated field names are visually highlighted.

12. The method of claim 1, wherein the representation based at least in part on the machine-generated extraction model includes a segment of the sample data with machine-generated field names substituted for data within the segment, and wherein the machine-generated field names are visually highlighted each with a different color.

13. The method of claim 1, wherein causing the presentation of the user interface including the representation based at least in part on the machine-generated extraction model further includes enabling the user to edit names depicted for fields of the machine-generated extraction model.

14. The method of claim 1, wherein causing the presentation of the user interface including the representation based at least in part on the machine-generated extraction model further includes enabling the user to edit an extraction pattern of the machine-generated extraction model.

15. The method of claim 1, wherein causing the presentation of the user interface including the representation based at least in part on the machine-generated extraction model further includes enabling the user to edit an extraction pattern of the machine-generated extraction model represented as a regex expression.

16. The method of claim 1, further comprising:
causing the presentation of the user interface enabling the user to indicate a correspondence between a field of the machine-generated extraction model and a field of an information model.

17. The method of claim 1, further comprising:
causing the presentation of the user interface enabling the user to indicate a correspondence between a field of the machine-generated extraction model and a field of an information model,
wherein storing the machine-generated extraction model includes storing a representation of the correspondence.

18. The method of claim 1, further comprising:
causing the presentation of the user interface enabling the user to engage processing to validate the machine-generated extraction model based on one or more categories of validation rules selectable by the user.

19. A system comprising:
a memory; and
a processing device coupled with the memory to:
cause a presentation of a user interface enabling a user to indicate an identifier for a technology extension for a data input and query system (DIQS) and to indicate access information for a data source external to the DIQS and associated with the technology extension,
receive user input indicating the identifier and the access information,
access sample data of the data source based at least in part on the access information, the sample data comprising a plurality of machine-generated events,
determine content automatically, based at least in part on the sample data, of a machine-generated extraction model for identifying field information in data of the data source, wherein determining content automatically of the machine-generated extraction model comprises:
performing pattern recognition within the sample data to predict breakpoints between the plurality of machine-generated events,
dividing the sample data into the plurality of machine-generated events based on the breakpoints between the plurality of machine-generated events,
generating a plurality of field predictions of the plurality of machine-generated events,
clustering the plurality of machine-generated events into a first plurality of extraction groups comprising a first group, wherein the first group comprises a portion of the plurality of machine-generated events,
automatically determining a first extraction rule that extracts field data from the first group based on the plurality of field predictions,
determining that the first extraction rule fails to satisfy a criterion based on a proportion of the field data successfully extracted,
re-clustering the plurality of machine-generated events into a second plurality of extraction groups responsive to the first extraction rule failing to satisfy the criterion,
automatically determining a second extraction rule that extracts field data from a second group of the second plurality of extraction groups based on the plurality of field predictions,
determining that the second extraction rule satisfies the criterion, and
adding the second extraction rule to the machine-generated extraction model based on the second extraction rule satisfying the criterion,
cause the presentation of the user interface including a representation based at least in part on the machine-generated extraction model and enabling the user to indicate an acceptance of the machine-generated extraction model,
upon user acceptance of the machine-generated extraction model, causing the presentation of the user interface including a plurality of validation rule categories that each represent a group of one or more validation rules, and configuring, responsive to a user interaction with the user interface, a validation rule category and at least one validation rule within at least one of the plurality of validation rule categories to obtain a configuration, wherein the validation rule category is in the plurality of validation rule categories;

activating a validation process and presenting a validation result based on the configuration; and upon user approval of the validation result, store the machine-generated extraction model in association with the identifier.

20. The system of claim 19, wherein the machine-generated extraction model includes the second plurality of extraction groups based at least in part on a cluster analysis of a representation of the sample data and wherein each extraction group is associated with an extraction pattern.

21. The system of claim 19, wherein the representation based at least in part on the machine-generated extraction model includes a segment of the sample data with machine-generated field names substituted for data within the segment.

22. The system of claim 19, wherein the representation based at least in part on the machine-generated extraction model includes a segment of the sample data with machine-generated field names substituted for data within the segment, and wherein the machine-generated field names are visually highlighted.

23. The system of claim 19, wherein the representation based at least in part on the machine-generated extraction model includes a segment of the sample data with machine-generated field names substituted for data within the segment, and wherein the machine-generated field names are visually highlighted each with a different color.

24. The system of claim 19, wherein causing the presentation of the user interface including the representation based at least in part on the machine-generated extraction model further includes enabling the user to edit names depicted for fields of the machine-generated extraction model.

25. The system of claim 19, wherein causing the presentation of the user interface including the representation based at least in part on the machine-generated extraction model further includes enabling the user to edit an extraction pattern of the machine-generated extraction model.

26. The system of claim 19, wherein the processing device coupled with the memory is further to:

cause the presentation of the user interface enabling the user to indicate a correspondence between a field of the machine-generated extraction model and a field of an information model, and wherein storing the machine-generated extraction model includes storing a representation of the correspondence.

27. A non-transitory computer readable storage medium encoding instructions thereon that, in response to execution by one or more processing devices, cause the one or more processing devices to perform operations comprising:

causing a presentation of a user interface enabling a user to indicate an identifier for a technology extension for a data input and query system (DIQS) and to indicate access information for a data source external to the DIQS and associated with the technology extension;

receiving user input indicating the identifier and the access information;

accessing sample data of the data source based at least in part on the access information, the sample data comprising a plurality of machine-generated events;

automatically determining content, based at least in part on the sample data, of a machine-generated extraction model for identifying field information in data of the data source, wherein automatically determining content of the machine-generated extraction model comprises:

performing pattern recognition within the sample data to predict breakpoints between the plurality of machine-generated events, dividing the sample data into the plurality of machine-generated events based on the breakpoints between the plurality of machine-generated events, generating a plurality of field predictions of the plurality of machine-generated events, clustering the plurality of machine-generated events into a first plurality of extraction groups comprising a first group, wherein the first group comprises a portion of the plurality of machine-generated events, automatically determining a first extraction rule that extracts field data from the first group based on the plurality of field predictions, determining that the first extraction rule fails to satisfy a criterion based on a proportion of the field data successfully extracted, re-clustering the plurality of machine-generated events into a second plurality of extraction groups responsive to the first extraction rule failing to satisfy the criterion, automatically determining a second extraction rule that extracts field data from a second group of the second plurality of extraction groups based on the plurality of field predictions, determining that the second extraction rule satisfies the criterion, and adding the second extraction rule to the machine-generated extraction model based on the second extraction rule satisfying the criterion;

causing the presentation of the user interface including a representation based at least in part on the machine-generated extraction model and enabling the user to indicate an acceptance of the machine-generated extraction model;

upon user acceptance of the machine-generated extraction model, causing the presentation of the user interface including a plurality of validation rule categories that each represent a group of one or more validation rules, and configuring, responsive to a user interaction with the user interface, a validation rule category and at least one validation rule within at least one of the plurality of validation rule categories to obtain a configuration, wherein the validation rule category is in the plurality of validation rule categories;

activating a validation process and presenting a validation result based on the configuration; and upon user approval of the validation result, storing the machine-generated extraction model in association with the identifier.

28. The non-transitory computer readable storage medium of claim 27, wherein the machine-generated extraction model includes the second plurality of extraction groups.

29. The non-transitory computer readable storage medium of claim 27, wherein the machine-generated extraction model includes the second plurality of extraction groups based at least in part on a cluster analysis of a representation of the sample data and wherein each extraction group is associated with an extraction pattern.

30. The non-transitory computer readable storage medium of claim 27, wherein the representation based at least in part on the machine-generated extraction model includes a segment of the sample data with machine-generated field names substituted for data within the segment.

* * * * *